United States Patent
Chulsky et al.

(10) Patent No.: US 11,336,628 B2
(45) Date of Patent: May 17, 2022

(54) METHODS AND SYSTEMS FOR SECURING ORGANIZATIONAL ASSETS IN A SHARED COMPUTING ENVIRONMENT

(71) Applicant: Actifile LTD, Netanya (IL)

(72) Inventors: Simon Chulsky, Netanya (IL); Guy Bavly, Herzlia (IL); Assaf Litai, Tel-Aviv (IL)

(73) Assignee: Actifile LTD, Netanya (IL)

( * ) Notice: Subject to any disclaimer, the term of this patent is extended or adjusted under 35 U.S.C. 154(b) by 337 days.

(21) Appl. No.: 16/671,448

(22) Filed: Nov. 1, 2019

(65) Prior Publication Data
US 2020/0145386 A1 May 7, 2020

Related U.S. Application Data

(60) Provisional application No. 62/754,407, filed on Nov. 1, 2018.

(51) Int. Cl.
| | |
|---|---|
| H04L 9/40 | (2022.01) |
| H04L 29/06 | (2006.01) |
| H04L 43/08 | (2022.01) |
| G06F 21/60 | (2013.01) |

(52) U.S. Cl.
CPC ........ *H04L 63/0428* (2013.01); *G06F 21/602* (2013.01); *H04L 43/08* (2013.01)

(58) Field of Classification Search
CPC .... H04L 63/0428; H04L 43/08; G06F 21/602
See application file for complete search history.

(56) References Cited

U.S. PATENT DOCUMENTS

| | | | |
|---|---|---|---|
| 7,406,596 B2 | 7/2008 | Tararoukhine et al. | |
| 7,409,547 B2 | 8/2008 | Stamos et al. | |
| 8,346,532 B2 | 1/2013 | Chakra et al. | |
| 8,769,605 B2 | 7/2014 | Kaufmann et al. | |
| 9,672,366 B1 | 6/2017 | Khetawat et al. | |
| 9,912,702 B2 | 3/2018 | Betzler et al. | |
| 2017/0104768 A1 | 4/2017 | Semenko et al. | |
| 2017/0237747 A1* | 8/2017 | Quinn | G06F 21/602 726/29 |
| 2017/0310693 A1* | 10/2017 | Howard | H04L 63/166 |
| 2018/0004975 A1 | 1/2018 | Bryan | |
| 2018/0189467 A1* | 7/2018 | Rao | G06F 21/316 |
| 2020/0019717 A1* | 1/2020 | Steffey | H04L 9/3239 |

FOREIGN PATENT DOCUMENTS

| | | |
|---|---|---|
| CN | 103401885 A | 11/2013 |
| CN | 104361294 A | 2/2015 |
| CN | 106778328 A | 5/2017 |
| CN | 107659632 A | 2/2018 |

* cited by examiner

*Primary Examiner* — Arvin Eskandarnia
(74) *Attorney, Agent, or Firm* — Bekiares Eliezer LLP

(57) ABSTRACT

Embodiments of the present disclosure provide methods and systems that configured to, generally, and in no particular order, perform one or more of the following functions: distinguish and identify secured assets that are permitted to an end-point to employ within a shared computing environment; monitor the end-point for certain triggering events, such as data creation, reception, manipulation, storage, or extraction associated with a secured asset; upon detection of a triggering event, monitor at least one unsecured container in order to determine if at least a portion of the secured asset has been otherwise transferred to an unsecured container; and encrypt the unsecured container in order to secure the otherwise unsecured asset.

19 Claims, 19 Drawing Sheets

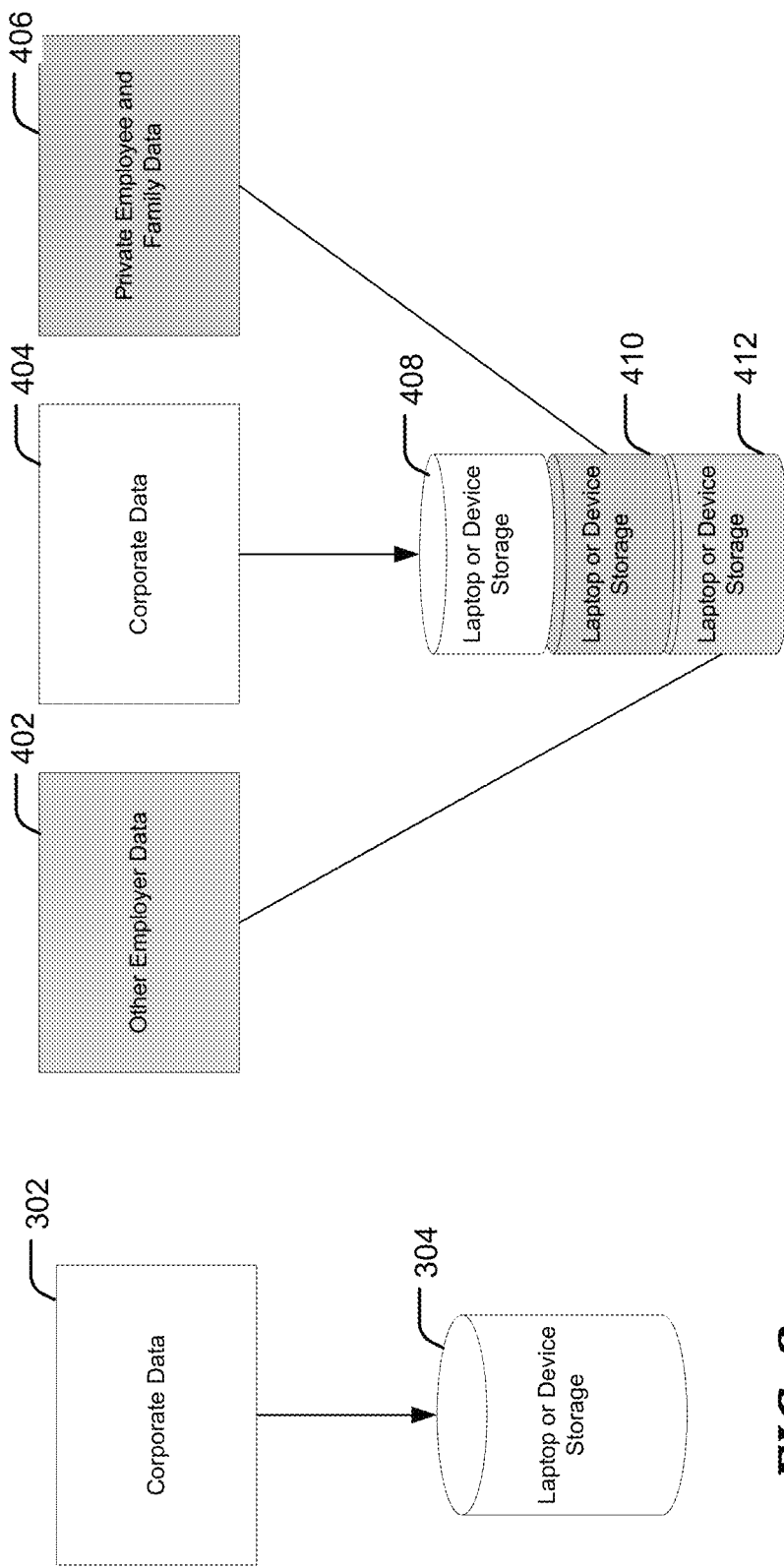

METHODS AND SYSTEMS FOR SECURING ORGANIZATIONAL ASSETS IN A SHARED COMPUTING ENVIRONMENT

CROSS REFERENCE TO RELATED APPLICATIONS

This application claims the benefit of priority to U.S. provisional application Ser. No. 62/754,407, filed Nov. 1, 2018, which is hereby incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to file security and compliance, file access and usage monitoring, and data encryption and extraction control.

BACKGROUND

The "Gig Economy" brings with it great efficiency for employers. And with the great efficiency comes great risk—transitory employees and consultants use their own devices which are not protected by the corporate Information Security (InfoSec) systems. Every year, the amount of data generated, relied upon, and stored by companies rapidly increases, as well as the use of that data across various worker types such as, for example, contingent workers, contractors, part-time employees, consultants and other vendors.

In many situations, such worker types may need access to the data with remote devices. These workers may use corporate endpoints (EP) for such access. Unfortunately, these EPs are often used outside the safety of the organizational information security perimeter. Moreover, it is not uncommon that the EPs are used for personal activities. This may result in various problems, including, but not limited to, misappropriation of otherwise confidential data.

Such misappropriation is not just a problem for large organizations. Small businesses can suffer from, for example, employees leaking contract details to rival firms such as client lists, trade secrets, financial accounts or other sensitive information. Increasing regulatory pressure on employers to safeguard their information signals that this risk is becoming more and more significant, outside the organization perimeter and across the supply chain.

BRIEF TECHNICAL OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure provide methods and systems for the secure monitoring, tracking, classifying, encrypting, controlling, and auditing of secured assets on computing devices. Such computing devices may be referred to as a "private device" throughout the present disclosure. A private device may comprise, for example, but not be limited to, a computing device with access to secured organizational assets, but not be owned or operated by the organization that governs those secured assets. Embodiments of the present disclosure enable these private devices to access and use the secured organizational assets, on a permissioned system, while preserving privacy, data security, and personal productivity of the device owner on his or her private device.

In addition to secured organizational assets, the private device may comprise other assets, such as personally owned data or data belonging to other, third party organizations. Such other data may be referred to as "private assets" throughout the present disclosure. Often times, a private device may share, expose, or otherwise comingle private assets with the secured organization assets in the same computing environment. Embodiments of the present disclosure provide a solution that can transparently isolate and govern secured assets within such shared computing environments. The transparent isolation and governance of secured assets within a shared computing environment may be referred to as a "Chinese wall" method and system throughout the present disclosure. Implementing a Chinese well consistent with embodiments of the present disclosure enables an organization to provide security and compliance to a secured organization asset on a private device.

Still consistent with embodiments of the present disclosure, a private device may be configurable as an end-point within an organizational network. As an end-point, the private device may have access to secured organizational assets such as, for example, but not limited to, organizational content, files, information, and other types of data. Although various embodiments disclosed herein reference organizational data as the secured asset, it should be understood that various other asset types may be within the scope such embodiments.

For example, the private device, as a network end-point, may access and use data from a secured data source within the organization. The private device may access and transfer a secured data asset from the secured data source onto, for example, a local computing environment within the end-point. Embodiments of the present disclosure provide methods and systems that may monitor such access and usage of secured data, and implement control to, for example, but not limited to, encrypt the secured data on the end-point or prevent extraction of the secured data from the end-point to an un-secured location. These methods and systems may be collectively referred to as a "platform" throughout the present disclosure.

As will be disclosed with reference to FIGS. 5-6, a platform consistent with embodiments of the present disclosure may be implemented throughout various nodes of an organizational network. In one instance, the platform may comprise a software application implemented on a private device, which serves as a registered end-point within the network. Such software application may be configured to provision the private device as a governed organizational end-point, even though the private device implements a computing environment that shares secured organizational assets with private assets. One such use case may be, for example, the provisioning of a private device belonging to a third-party vendor, such as a consultant hired by an organization. The software application may, in turn, provision the private device belonging to the consultant, thereby enabling the consultant to share their computing environment with secured organizational assets.

Still consistent with embodiments of the present disclosure, the platform may then monitor, track, classify, encrypt, control, and audit the secured organization assets on the end-point without accessing or otherwise exposing the private assets on the end-point or over-burdening the end-points system resources. To that end, the platform may implement methods and systems that configured to, generally, and in no particular order, perform at least one of the following functions:

i) distinguish and identify secured assets that are permitted to an end-point to employ within a shared computing environment;

ii) monitor the end-point for certain triggering events, such as, for example, but not limited to, data creation, reception, manipulation, storage, or extraction associated with a secured asset; and iii) upon detection of a triggering event associated with the secured asset, implement rules-based actions, controls or alerts associated with the secured asset.

In further embodiments, the platform may implement methods and systems that are configured to, generally, and in no particular order, perform at least one of the following functions:

i) distinguish and identify secured assets that are permitted to an end-point to employ within a shared computing environment;

ii) monitor the end-point for certain triggering events, such as, for example, but not limited to, data creation, reception, manipulation, storage, or extraction associated with a secured asset;

iv) upon detection of a triggering event, monitor at least one unsecured container in order to determine if at least a portion of the secured asset has been otherwise transferred to an unsecured container;

iii) encrypt the unsecured container in order to secure the otherwise unsecured asset within the encrypted container upon a determination that the unsecured container contains at least a portion of a secured asset;

iv) classify the encrypted container as a secured asset by propagating a security status to a metadata associated with the encrypted container; and v) monitor, track, control, audit, and re-classify, as needed, the secured assets without expending system resources on monitoring the private assets.

Still consistent with the embodiments disclosed herein, the platform may implement one or more asset classification methods and systems in order to secure organizational assets on private devices. For example, in some instances, the platform may monitor an end-point to detect a creation, reception, or otherwise storage of data within a shared computing environment. Further still, the detected data may reside in an unsecured container within the shared computing environment. An unsecured container, or unsecured data, may be used throughout the present disclosure as terms indicative of, for example, but not limited to, any data (e.g., textual or graphical), software used in conjunction with the data (e.g., a web-browser or word processor), or data storage location (e.g., local or external) that has not been otherwise secured in accordance to the methods and systems disclosed in the embodiments herein. The platform may classify such unsecured data in accordance with one or more of following classification methods and systems, and in no particular order:

i) Data type based classification;
ii) Origin based classification; and
iii) Inheritance based classification.

Accordingly, the platform may analyze the data to determine a data type and origin of the data. In turn, the platform may ascertain whether the data comprises a secured asset and is to be encrypted and monitored as a secured asset within the shared computing environment. Moreover, in certain instances, the platform may analyze metadata associated with the data to ascertain an inheritance status indicative of whether the data has received content that may have been, for example, extracted from a secured asset.

During a data type based classification stage, the platform may be configured to read the data and determine what type of data it is. A data classification and rules database may be cross-referenced in this process. In some embodiments, the database may be compiled by, for example, an analysis of existing organizational secured assets in order to ascertain content, patterns, and types of data that are often characterized as secured assets. These parameters may then be associated with rules for securing other data that may contain similar or identical characteristics to other secured organizational assets.

In turn, the platform may analyze unsecured containers to determine a file-type associated with the data, a content marker within the data, a content of interest within the data, or any other characteristic or parameter of the unsecured container in accordance to the data classification and rules database. If it is determined that a data classification rule is met, the platform may proceed to secure and encrypt the data container into a secured asset. In some embodiments, however, the platform may further process the unsecured data against additional rules, beyond the data type classification, prior to determining whether to secure and encrypt the data container into a secured asset.

During an origin based classification stage, the platform may be configured to track how an unsecured data container came to obtain its data. For example, the platform may trace the data to determined if it entered the shared computing environment from a private place of origin (i.e., outside of the organizational network) or a governed place of origin (i.e., from within the organizational network). In one instance, it may be determined that data within an unsecured data container originated from an email attachment received from an email account associated with the organization (e.g., a corporate email address associated with the owner of the private device). While in another instance, it may be determined that data within the unsecured data container originated from an otherwise private network (e.g., a file from a home network).

In yet further embodiments, the platform may be configured to, for example, monitor input and output means of the private device or the activities within a software application operating on the private device. In this way, the platform may detect that the unsecured container (e.g., a newly created word document) contains data that originated from an extraction of content from a secured asset (e.g., a copy/paste of secured data into the unsecured container). Further still, embodiments of the present disclosure may be assess metadata associated with an unsecured asset to ascertain origin parameters (e.g., an author or creator of the unsecured container).

If it is determined that the unsecured container has data originating from, or otherwise related to, a secured asset, the platform may proceed to secure and encrypt the data container into a secured asset. In some embodiments, however, the platform may further process the unsecured data against additional rules, beyond the origin type classification, prior to determining whether to secure and encrypt the data container into a secured asset.

Accordingly, embodiments of the present disclosure may use data-type and origin-based classification methods and systems individually or in combination. For example, a social security number may be classified as a secured asset data type. However, when classified in combination with its origin, the classification status may change. Continuing the instant example, it may be determined that the social security number originated from a person email communication from a family member of the private device owner. Still consistent with embodiments of the present disclosure, classification methods and systems may be further defined based on, at least in part, a cross-referencing of the permissions and privileges of an owner of the private device as an end-point user type of the organization. Thus, in this instance and analogous embodiments, the platform may use more than one classification methods and systems in conjunction to ascertain a security status of an unsecured container.

It should be noted that, in some embodiments, once the platform encrypts and secures an otherwise unsecured container, the platform may then pass the newly secured asset back to within an organization-controlled location (e.g., a server under organizational control). The secured asset may then be accessed for further processing and analysis by, for example, a system administrator. In further embodiments, a system administrator may be alerted or reported as to all classification activities, whether or not an encryption of an unsecured asset is necessary. A system administrator may, in turn, for example, be enabled to change a classification status of the newly secured asset or, for example, update a permission level associated with the private device owner.

In various embodiments, the extent to which the platform may monitor a private device in a shared computing environment may be based on the private device owner's role within the organizational network. Permissions associated with each network end-point may be specified based on the owner's role and include, for example, but not be limited to, be based on non-data related parameters (e.g., always-on or log-on only) and data-related parameters (e.g., data-type based, origin based, inheritance based).

The platform may employ, for example, a software application installed on the end-point to perform the monitoring functions. In accordance to embodiments of the present disclosure, monitoring an end-point may comprise, but not be limited to, for example, one or more of the following functions:
  i) User interaction monitoring;
  ii) Application and process monitoring; and
  iii) File level activity monitoring.

In one instance, the platform may be configured to monitor user interactions including, for example, but not limited to, user inputs (e.g., mouse, keyboard, touch-screen, gestures, voice-commands) into the end-point. The user inputs may be monitored in the context of, for example, an unsecured container (e.g., a word processor, unsecured data storage location, or unsecured file-type) or in the context of the entire shared computing environment. Then, for example, when an extraction event is detected (e.g., by way of user providing a corresponding combination of input commands), classification events may be performed to ascertain whether an encryption is necessary to any unsecured asset that may receive the extracted content.

In another instance, the platform may be configured to monitor applications and processes running on the end-point. In some embodiments, the monitored applications and process may be registered with the platform as a trusted application or process running on the end-point. As such, the trusted application or process may provide the platform with the necessary transparency to assess the activities performed by a user with regard to secured asset utilization. In this way, the platform may ascertain what actions are being performed with regard to the secured assets by the trusted applications or processes. In turn, for example, when an extraction event is detected (e.g., by way of user utilizing a trusted application to extract content from the secured asset), classification events may be performed to ascertain whether an encryption is necessary to any unsecured asset that may receive the extracted content.

In yet another instance, the platform may be configured to monitor the creation, reception, access, modification, propagation, extraction or otherwise manipulation of files in a storage location within the shared computing environment. Secured assets may be monitored at, for example, their storage location within the shared computing environment. As will be detailed below, one method of identifying a secured asset is to process the metadata associated therewith. The metadata may indicate an inheritance security status. For example, in some embodiments, once the platform has determined that this file is to be classified as a secured asset, an inheritance security status header may be added to the file's metadata.

The header may be added to the file and any other file that has determined to contain at least a portion of data deriving from a secured asset. This header then serves to ensure that the file or subsequent files derived from the content of the file gets classified as secured assets, even if their origin data is erased, a child record, object, or file is created, or tracking the origin no longer becomes feasible. In this way, such tagging method and system may serve to ensure that the children records, even though they may lose their origin data (e.g., get emailed from a private server or 'save as' operation to create a new file), are maintained as a secured asset. In other embodiments, other methods and systems of tracking secured assets may be employed. For example, a separate database may be employed in tracking the storage location of secured assets, even if the secured assets themselves are not annotated as such.

Having ascertained the location of secured assets within the shared computing environment, embodiments of the present disclosure may employ methods and systems for monitoring, tracking, re-classifying, encrypting, controlling, and auditing the secured assets. In turn, the platform may impose conventional file-level security methods and systems (e.g., access and edit restrictions) in addition to those disclosed in the various embodiments herein. In this way, activity with regard to an organization's secured assets remains secured and under-encryption within the shared computing environment, as it is accessed and manipulated by the end-point, without burdening the system resources of the end-point in monitoring unsecured assets.

The various embodiments disclosed herein may be further disclosed by way of the following non-limiting example associated with one or more of the following stages:
  i) monitoring an end-point and secured assets residing within a shared computing environment on the end-point;
  ii) detecting a first action on the end-point with regard to a secured asset (e.g., an copy action within, for example, a trusted application such as, for example, a web-browser loading a secured URL);
  iii) monitoring the end-point to detect an unsecured container (e.g., a child record, object, or file rendered by, for example, an untrusted application such as, for example, a word-processor generating a new document) to detect a second action (e.g., a paste action within, for example, the untrusted application);

iv) classifying the unsecured container (e.g., the child word document) to determine if at least a portion of the secured asset has been transferred to the unsecured container (e.g., rules-based classification);

v) performing a predefined action (e.g., encryption of a child object, alerting an administrator etc.) in accordance to the rules associated with the detected action, classification type of the secured asset, and a role of the owner of the end-point; and vi) propagating an inheritance security status to the child object (e.g., metadata defining a security classification of an asset in a shared computing environment).

It should be noted that, within certain embodiments, an action with regard to a secured asset might trigger the platform to monitor unsecured assets for unauthorized secured asset extraction. For example, if an extraction of data from a secured asset is detected, it may be imperative to determine a data asset that contains the transferred data, even if such data asset does not otherwise qualify for monitoring. As such, the platform may be configured to monitor the end-point for a creation or modification of any existing asset within the control of the end-point. It may be assumed by the platform that a modification or creation of an unsecured data asset subsequent to an extraction event from a secured data asset may be associated with the extraction of the secured data. In turn, the platform may attempt to secure such unsecured data asset and issue an alert. If securing the asset is not possible, data may be logged and communicated to a relevant system administrator for processing.

Furthermore, although the aforementioned non-limiting example references an action between a trusted application and an untrusted application, it should be understood that the various monitoring and classification techniques disclosed herein may be implemented between any application types (trusted or untrusted), in any combination. For example, a 'save as' in a trusted application may indicate the creation of a child object. Whereas a copy-paste operation to an untrusted application may be detected employing other monitoring techniques (e.g., key stroke monitoring), unrelated to the trusted application's communication with the platform.

Further still, in some embodiments, when a detected action is performed on a data asset between a data source and a data destination, the data asset may be encrypted prior to allowing the action to be completed. In this way, an unsecured container may be secured prior to receiving the secured asset in the event of an extraction. One such technique for securing an unsecured container may be to employ, for example, a security status within a metadata associated with the unsecured container. For example, in some embodiments, prior to enabling secured content to be saved within an unsecured container, a header associated with the unsecured container may be updated to reflect an inheritance of a secured asset into the unsecured container. In turn, the platform may read the header and encrypt the unsecured asset, thereby securing the asset. Accordingly, before secured assets are transferred to an unsecured medium (e.g., a USB key, unsecured document, unsecured location), the asset may be encrypted with a private key.

Still consistent with embodiments of the present disclosure, secured assets may be further monitored for changes. Changes may refer to modifications of the data contained within the secured asset or, for example, changes to classification rules associated with data no longer classified as secured. Accordingly, secured assets may undergo a "data validation" stage in order to determine whether the secured asset still contains data that is necessary to protect. If the secured asset no longer contains data necessary to protect, a security status stored in a header of the secured asset may be updated. Other methods and systems to update the security status of the asset are contemplated to be within the scope of the present disclosure. In turn, the platform may no longer expend resources in monitoring the asset.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

In the drawings:

FIGS. 1-2 illustrate a system stack consistent with certain embodiments of the present disclosure;

FIGS. 3-4 illustrate a flow of data consistent with certain embodiments of the present disclosure;

FIGS. 5-6 illustrate abstractions of an operating environment associated with certain embodiments of the present disclosure;

FIG. 7 illustrates an application architecture consistent with certain embodiments of the present disclosure;

FIG. 8 illustrates an end point of an operating environment associated with certain embodiments of the present disclosure;

FIGS. 9-10 illustrate methods for enabling certain embodiments of the present disclosure;

FIG. 11 is a flow chart of a method for securing a received file within a shared computing environment;

FIG. 12 is a flow chart of a method for securing a retrieved file within a shared computing environment;

FIG. 13 is a flow chart of a method for securing an opened file within a shared computing environment;

FIG. 14 is a flow chart of a method for securing an extracted asset within a shared computing environment;

FIG. 15 is a flow chart of a method for employing a trusted application within a shared computing environment;

Figure 16:
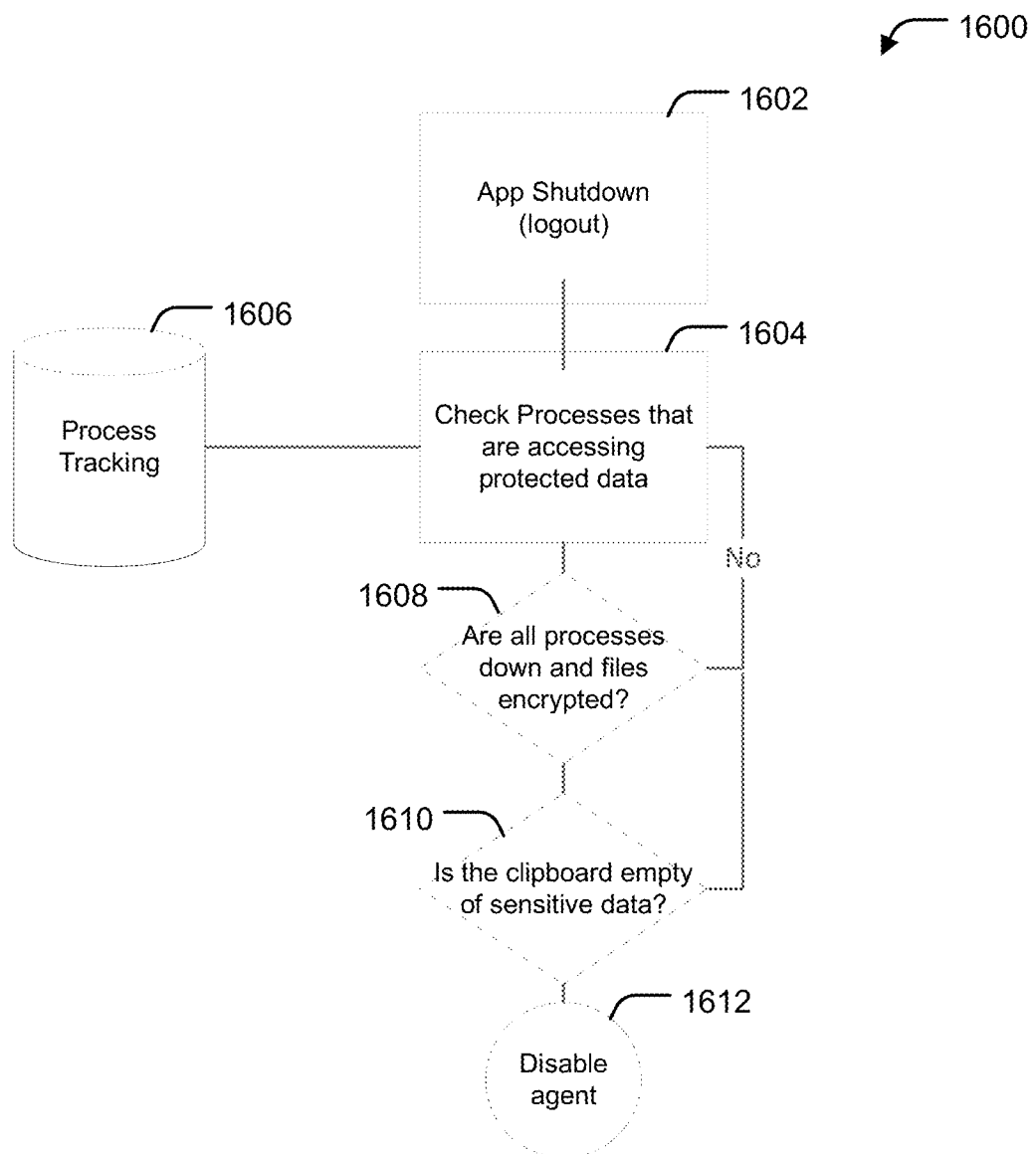
Figure 17:
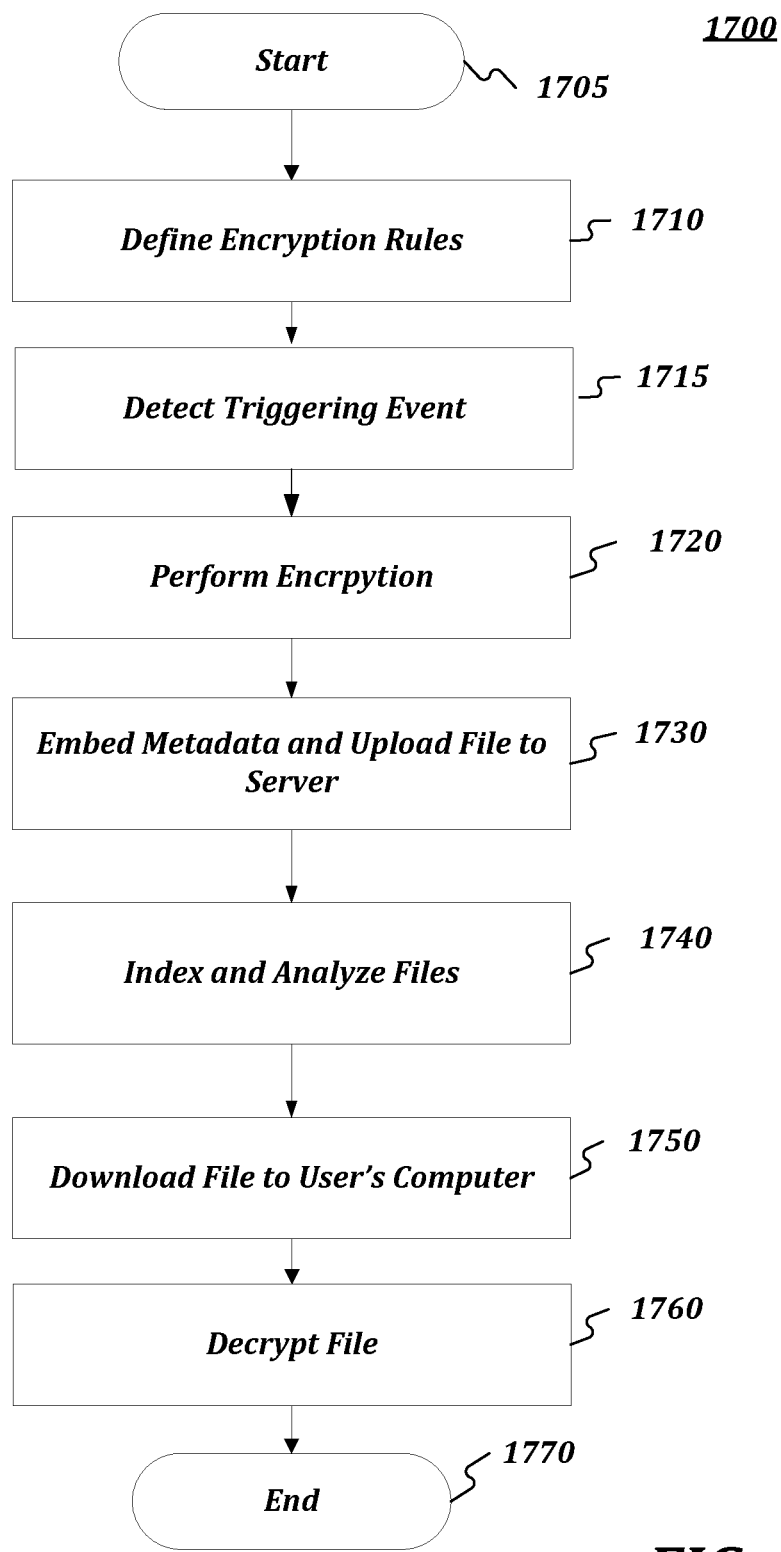
Figure 18:
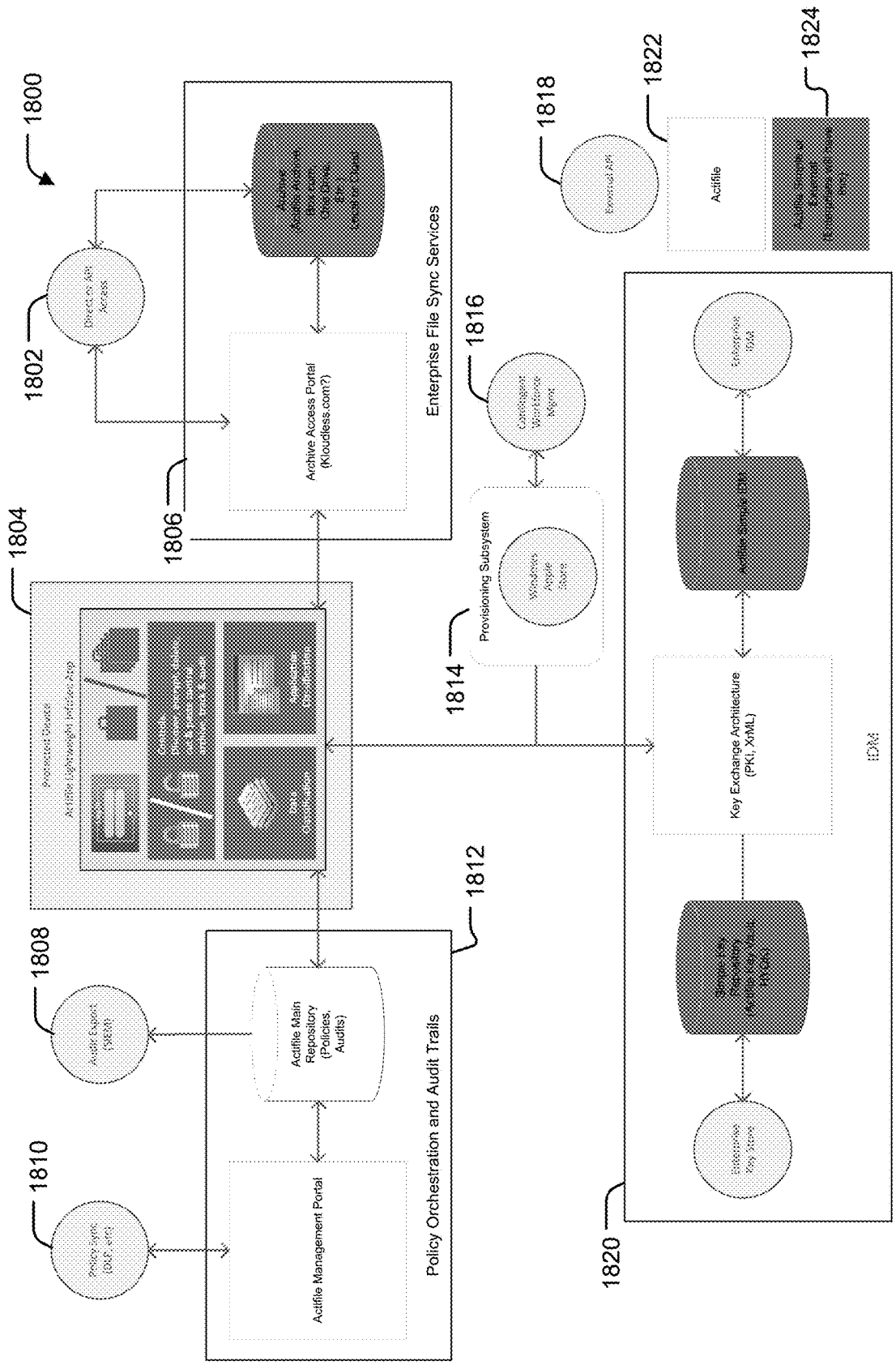
Figure 19:
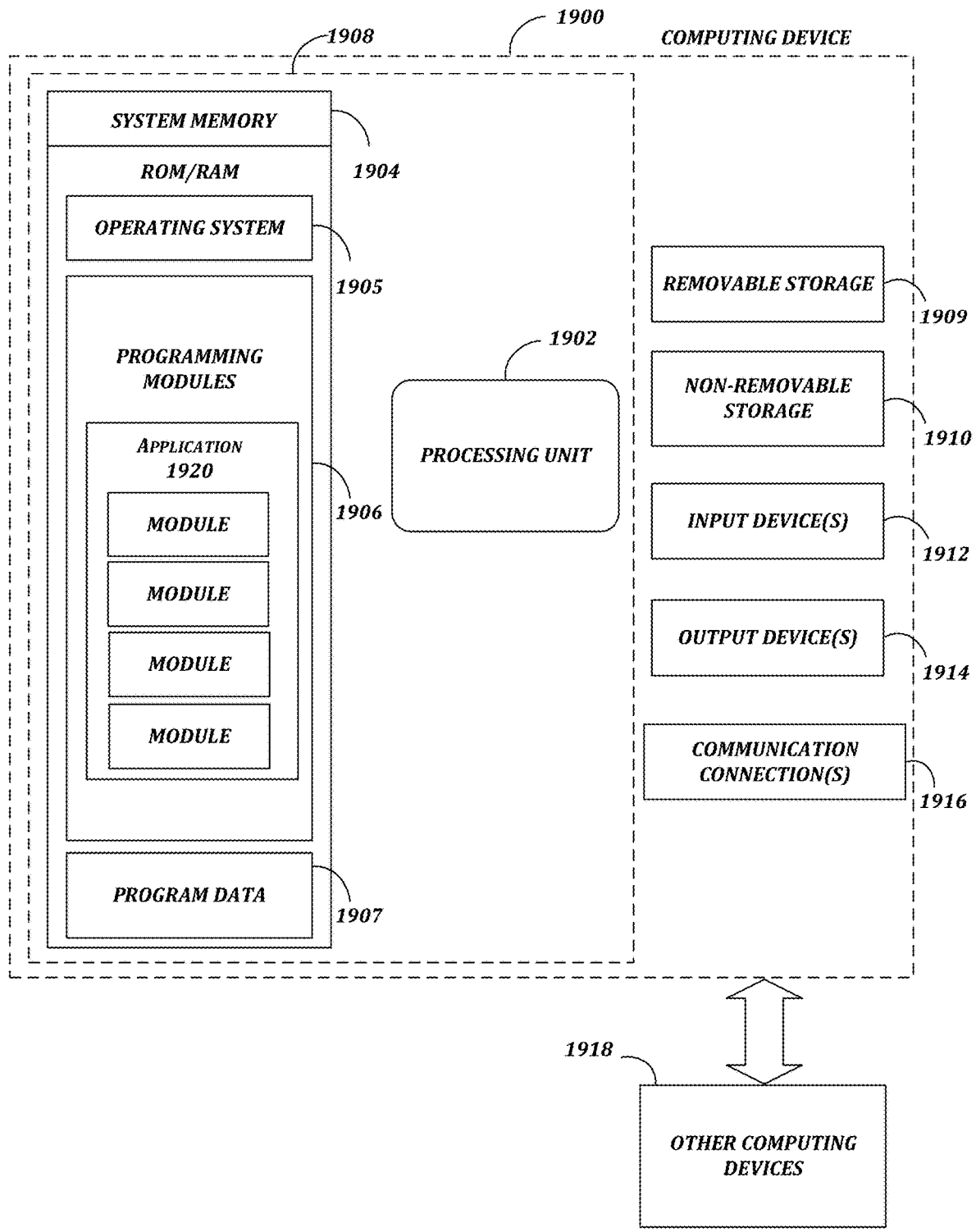
Figure 20:
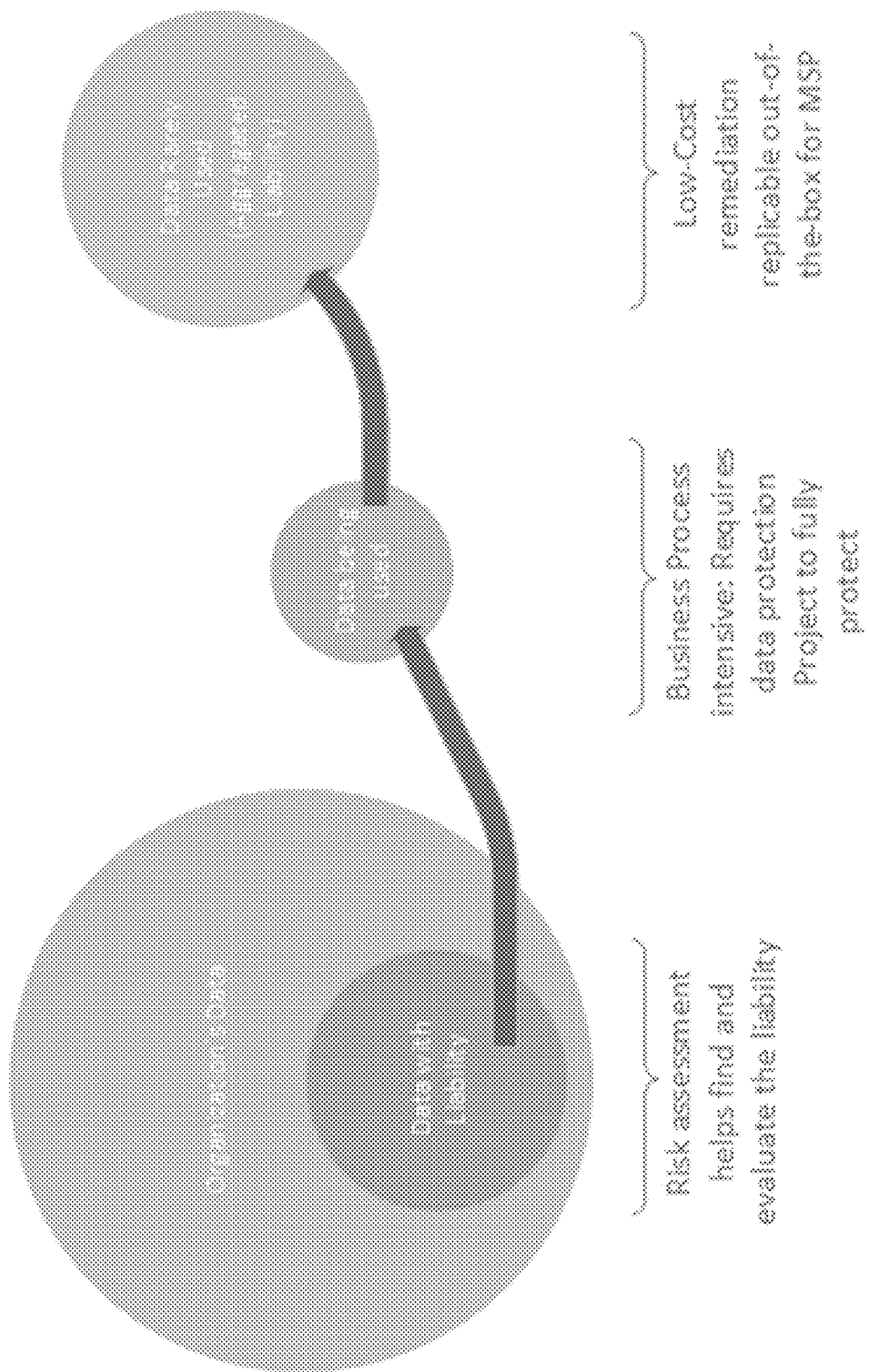

FIG. 16 is a flow chart of a method for deploying an application associated with certain embodiments of the present disclosure;

FIG. 17 is a flow chart of a method for encrypting and decrypting data associated with certain embodiments of the present disclosure;

FIG. 18 illustrates a system architecture consistent with certain embodiments of the present disclosure;

FIG. 19 illustrates a computing device compatible with certain embodiments of the present disclosure; and FIG. 20 illustrates a Venn diagram consistent with certain embodiments of the present disclosure.

DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of office file backup, embodiments of the present disclosure are not limited to use only in this context. For example, embodiments may be applied to document content monitoring and review, an alerting systems and methods associated with potential security, financial, legal or other content rules, permissions, restrictions, detecting violations inside the documents on user's end-point, and file path tracking for networked organizational data.

I. Technical Problem

Figure 1:
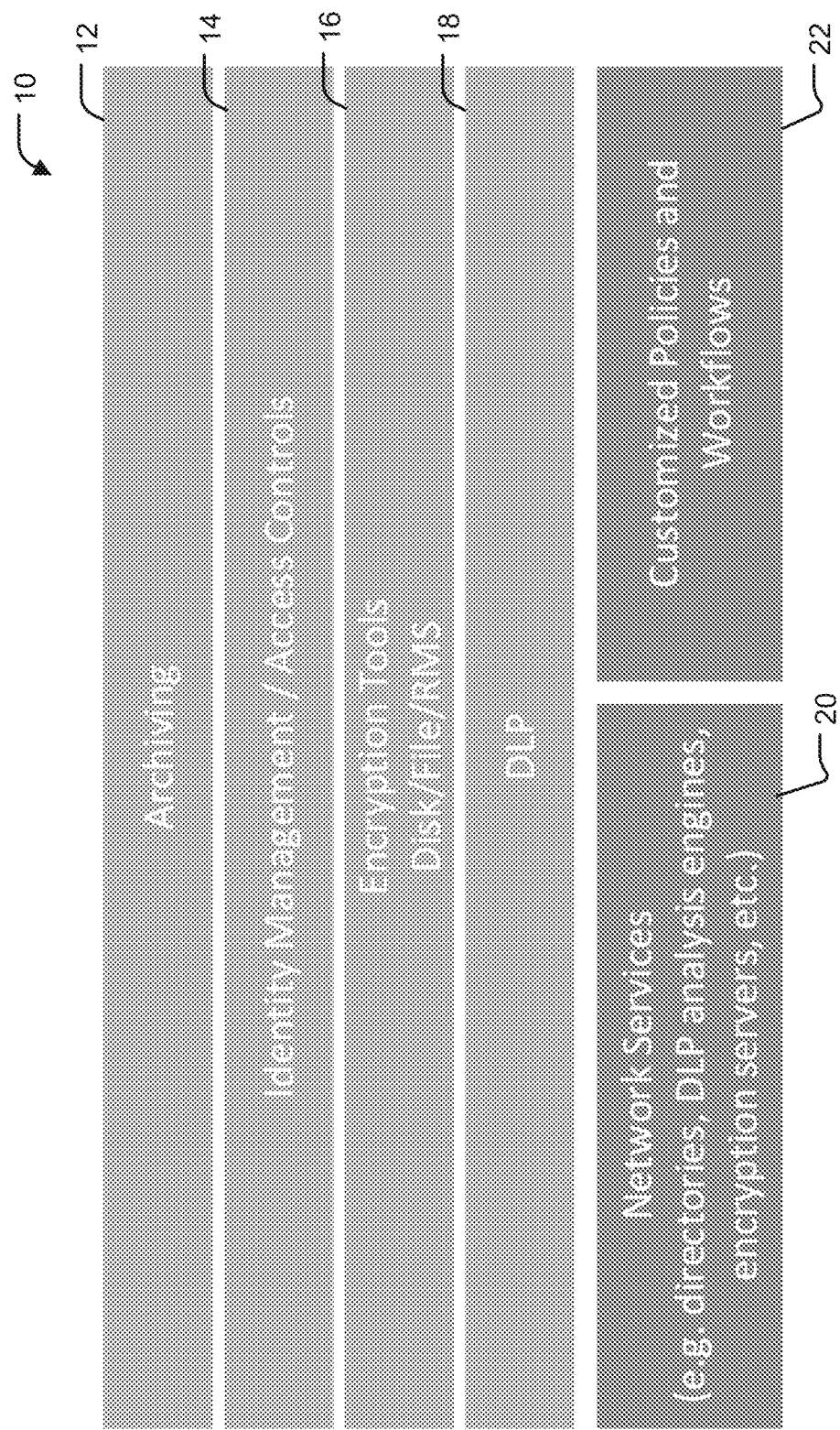

FIG. 1 shows a compliance stack 10. For most organizations it consists of a stack of enterprise applications including a mix of technologies such as data loss prevention (DLP) 18, encryption services 16, identity management services 14, archiving 12, network services 20, customized policies 22, discovery services and other solutions. This stack of products works well for users inside the network. For users outside the network (such as freelancers, consultants, contingent workforce and other Gig economy employees) the stack can't be deployed, thus creating unmanaged endpoints from an InfoSec perspective.

Some reasons include:

1. Lack of support for private devices: These devices are shared with other employers and the employees own personal information. A Chinese wall separating the employer's info from other information is needed.

2. The technologies depend on network services: Due to the risk posed by their potentially infected devices and to network performance issues, transitory employees are rarely afforded access to required services.

3. High TCO of pushing out and managing the stack: Stack systems are hard to push to and configure at endpoints (a problem usually addressed at internal employees by using a corporate image).

Figure 2:
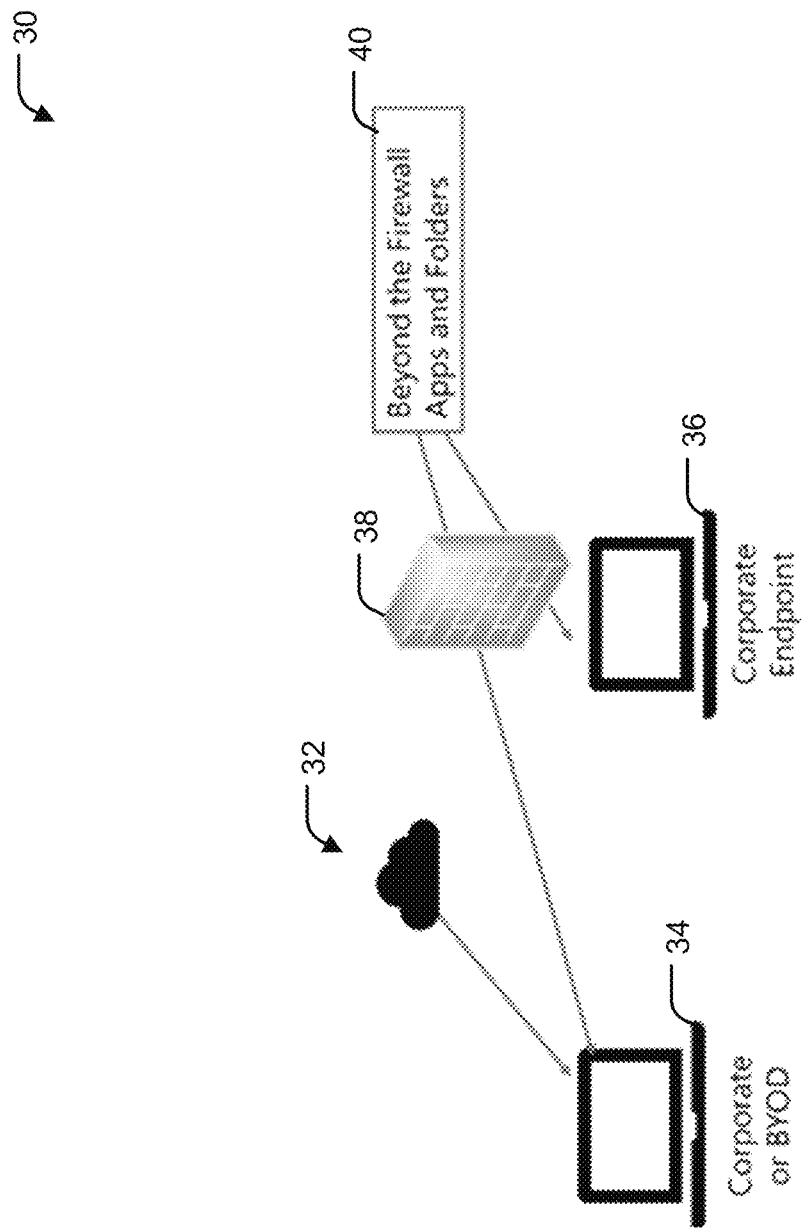

Inevitably, as illustrated in the scenario of FIG. 2, secured organizational assets, such as data, may be read and edited on end-points 34, 36 by private devices. For example, data 32 and 40 may be accessed by these end-points 34, 36 through firewall 38. Employers are shifting more key work to such employees and consultants: it is anticipated that by 2020 an average of 43% of employees in the US will be contingent, remote employees. Employers can no longer ignore the special InfoSec needs associated with this employment model. This situation is creating a substantial opportunity for an InfoSec and compliance solution as an alternative to the existing stack.

FIG. 3 illustrates a traditional Single Use Model (Device/Laptop Owned, Provisioned and Managed by Corporation) where corporate data 302 is accessed on laptop or storage device 304. FIG. 4 illustrates a more modern model with regard to the scenario of mixes between private 406 and corporate 404 (and even other employer 402) data. In the mixed-use scenario, a computer device 408, 410, 412 is used for more than one purpose. As an example, a computer owned by a consultant may have access to, or have stored on it (locally), information owned by multiple employers (present employers as well as past employers), and information owned by the consultant themselves and their family.

Most information security and data protection systems available today are designed to protect all of the device usage and everything on it. This creates various legal issues to whomever deploys such a system, including, for example, responsibility for other employer's data, exposure to data that isn't owned by the employer, and the like. So mixed use devices typically roam without the requisite information protection technologies. Mixed use devices are sometimes referred to as "unmanaged devices" in the industry.

II. Technical Solution

Figure 5:
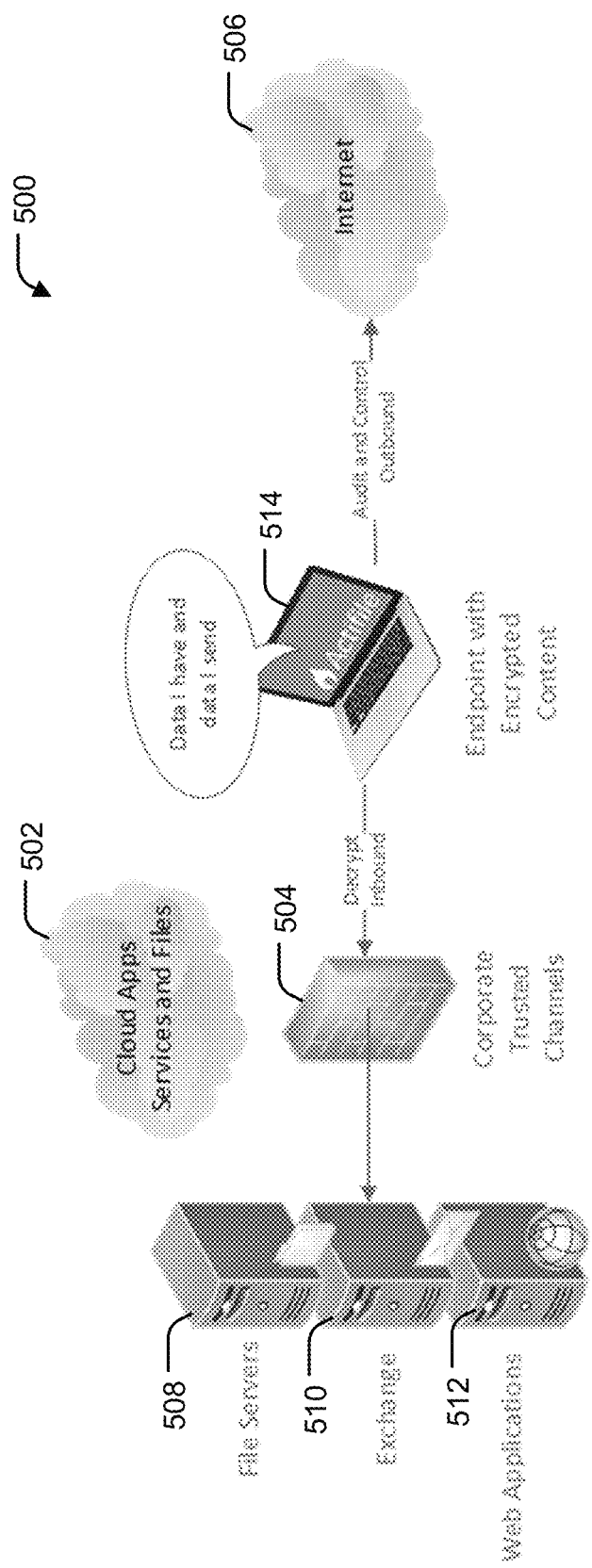

There is currently a need to provide authenticated users which are given the right level of permissions (authorization) by the organization the ability to work seamlessly without any change of user's work environment (like the use of virtual machines), but with one main difference: all the information related to the organization is governed: if extracted, downloaded or already existing, secured with encryption, monitored and archived. Conceptually, the platform of the present disclosure may create a "secured area" which is a virtual extension of the organization. Embodiments of the present disclosure may provide a platform that may be deployed in organization with shared end-points and/or allow the use of private devices that serve a user in both private and corporation functions. FIG. 5 illustrates one potential embodiment of this solution.

Since many users will share the same work environment 500 with private data and other data there is a need for a technology that can transparently isolate sensitive data from other data. Embodiments of the present disclosure go beyond simple data identification according to predefined strings (though it includes that capability as well), to origin classification and (i.e., where did the information come from?) and inheritance classification (e.g., identify all grandchildren, great-grandchildren, and the like). This combination of capabilities assures the classification is not event based (files is sent out of the organization as an example), but persistent at all times, can be turned on once the user logged in, and does not interfere with other private information assesses.

Origin and target based classification allows for very effective and easy to set up rules. Embodiments of the present disclosure enable identification of any data source: Cloud, On Prem or locally based, of any type: Application (e.g., ERP, CRM), Database, File Share and others. The platform may be agnostic not only the data source, but it immediately invokes an action of the file created on any source, regardless of the user action (e.g., copy & paste or download for instance), the tool used (e.g., office, BI tool, SQL Client, etc.) and regardless of the file type created. An action may be triggered according to a pre-defined rule, for instance: encrypt. Of particular importance, the platform may allow organizations to treat endpoints as transparent—encrypting data flowing out and decrypting it as it flows back in. This may significantly simplify endpoint rules and management.

As shown, the environment 500 typically includes endpoint 514 in communication with cloud apps and services 502 over networks 504/506, for example, The end-point may also access file servers 508, exchange servers 510, and web applications 512.

Figure 6:
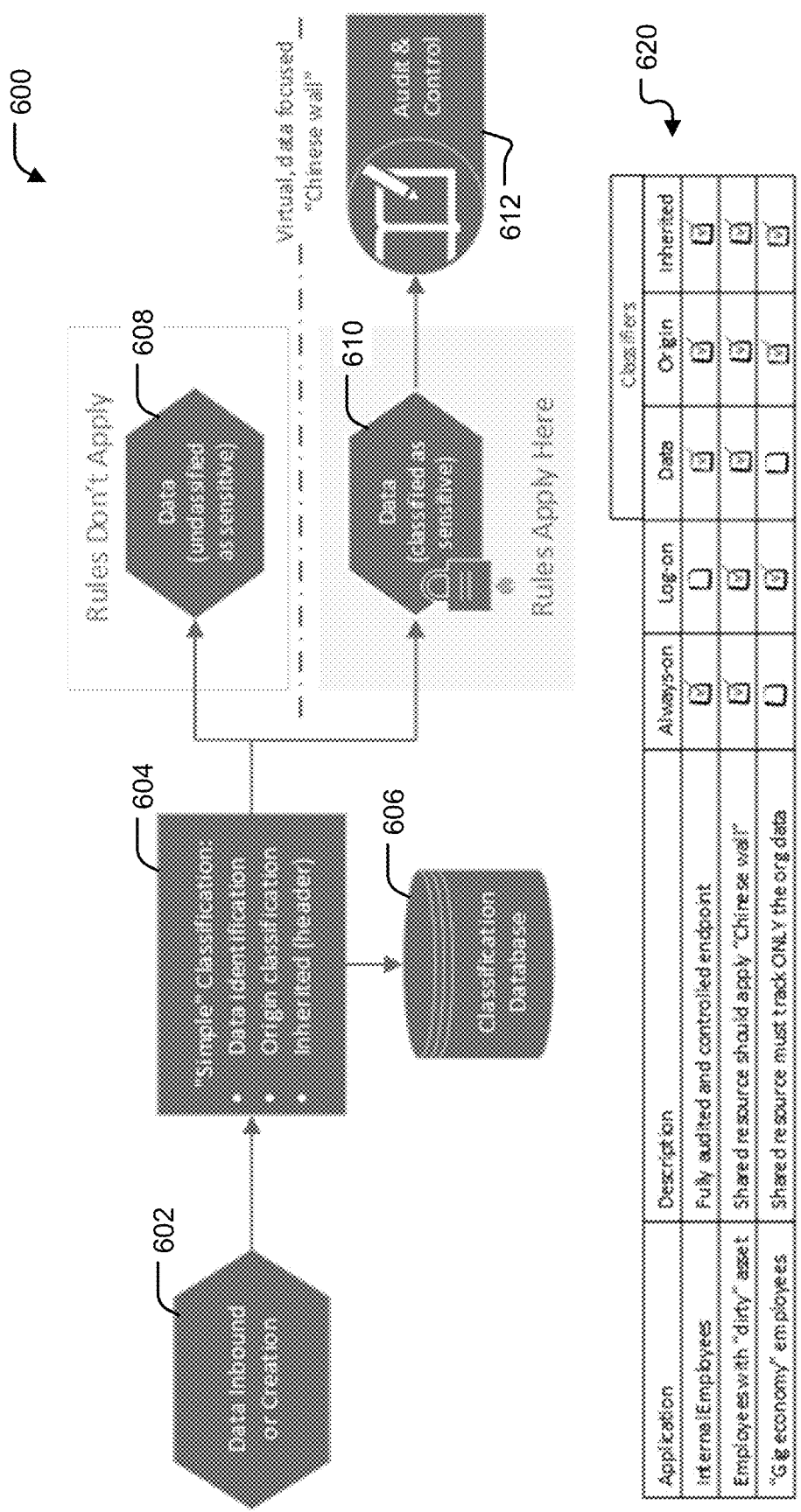

As shown in FIG. 6, origin and target based information protection, not only simplifies the setup and maintenance of the "Virtual Chinese Wall", but also makes it the right method to safeguard information outside the perimeter, especially in bring-your-own-device (BYOD) networks. As will be evident from the detailed description below, a platform consistent with embodiments of the present disclosure provides a multi-tier approach, including data based, origin based, and inheritance based classification of assets in order to maintain the "Virtual Chinese Wall," to meet the objective of separating private data with organization assets on an remote end-point. The platform may be designed such that the end-point need not be configured with a separate 'work-environment' for each organization that the end-point may be associated with, or 'home-environment' for personal use—rather, the methods and systems herein maintain the aforementioned Virtual Chinese Wall without requiring the end-point to run, or operate in parallel, separate instances of their operating environments.

The classification 600 includes inbound data 602 and initial simple classification 604. Other rules may be stored in database 606. Generally, data can be classified as sensitive data 610 or non-sensitive data 608, including audit and controls 612 for sensitive data 610. Example classifications 620 are also presented.

III. Platform Configuration

Figure 7:
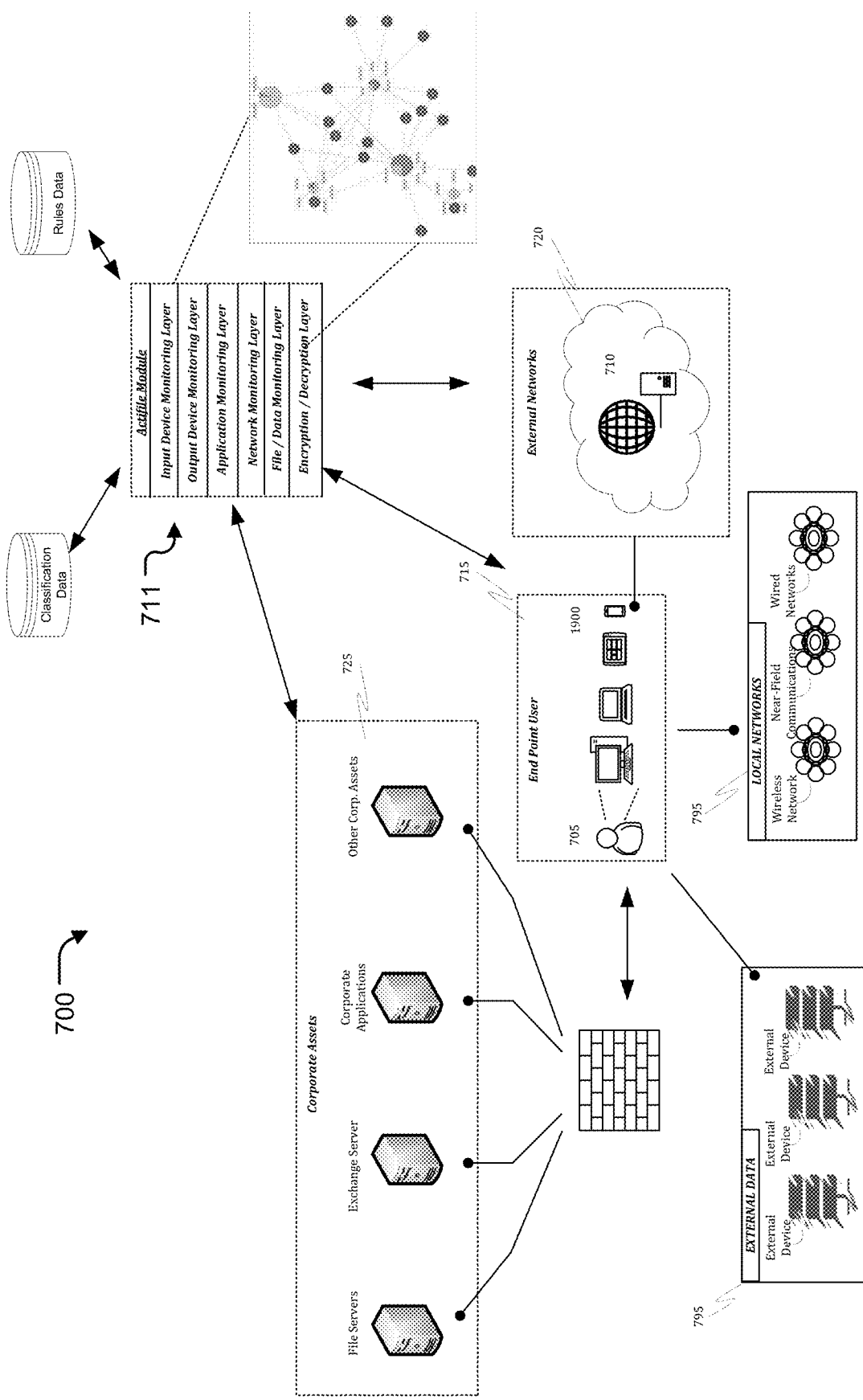
Figure 8:
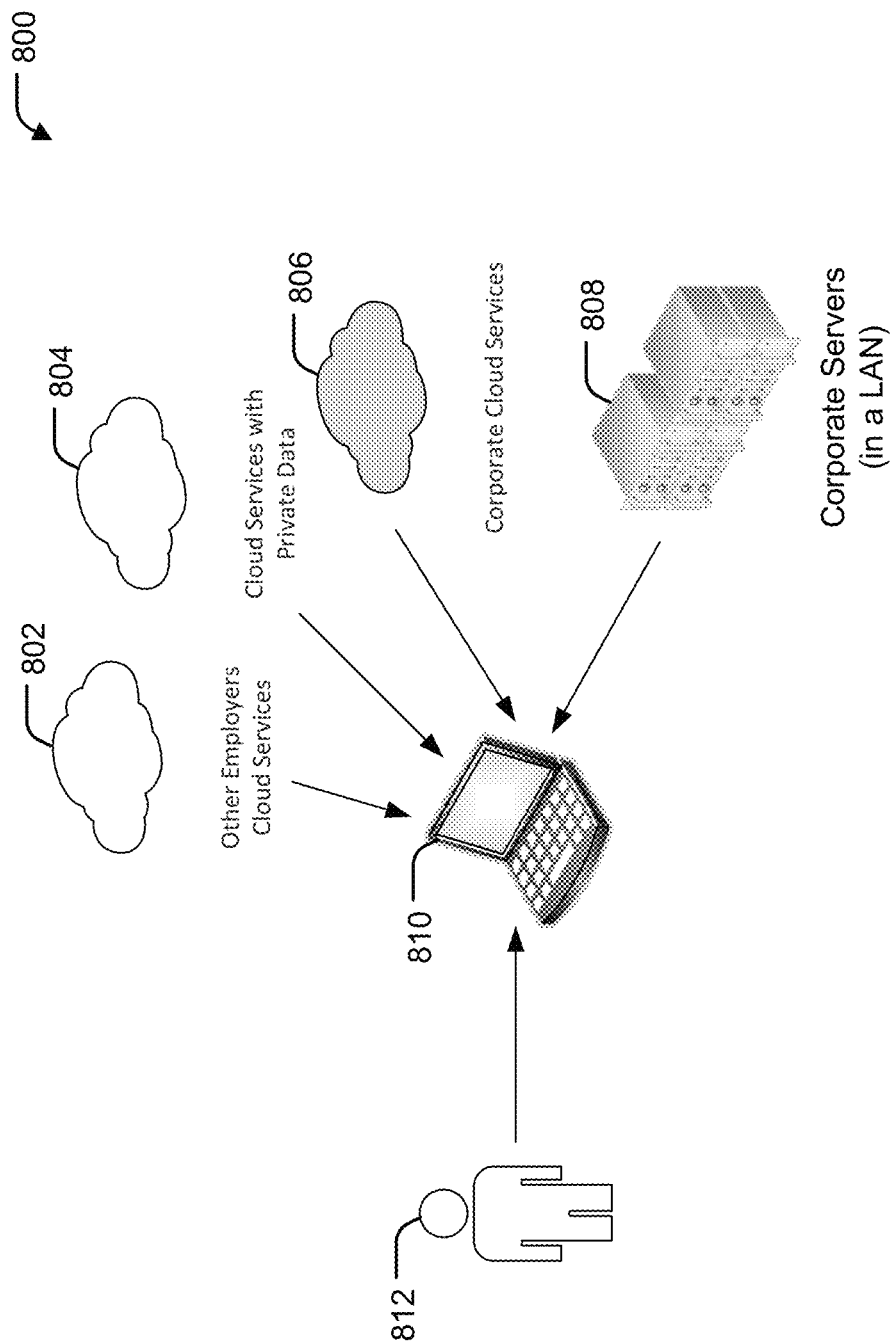

FIG. 7 and FIG. 8 are draft models of an operating environment of a platform 700 configuration. The draft model illustrates a software instance of the platform in operative communication and control, at least in part, with End Point devices 705 as well as organizational assets 725. The platform 700 includes a software component or module 711 configured to be easily deployed in the platform 700. End-points 705 may then access data 795 through networks 710/720. As data is classified according to the aspects herein, end-points accessing data maintain data security.

Figure 9:
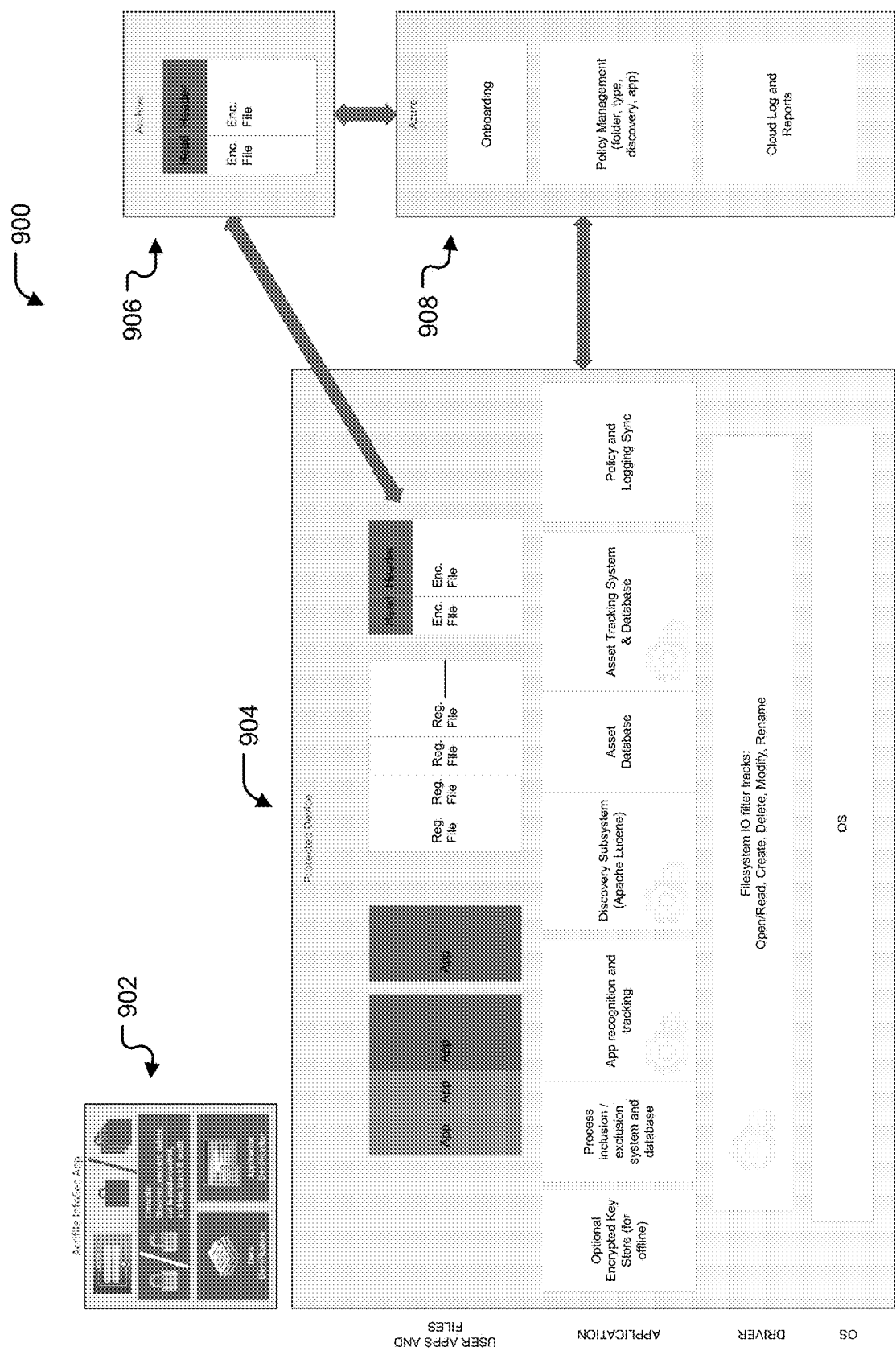

As shown in FIG. 8, platform 800 allows users 812 access secured assets 802, 804, 806, 808 using end-point 810. The draft model further illustrates the platform drawing a network model of secured end-points employing secured assets from the organization. FIG. 9 and FIG. 18 illustrate additional embodiments.

Embodiments of the present disclosure provide the following capabilities at an endpoint:
1. File level auditing and controls:
   a. a lightweight discovery engine for detecting data at rest risks.
   b. transparent encryption with group share functions and support for local and remote folders.
   c. file usage auditing and control through processes and windows (print, copy, delete etc.).
   d. archives employer's information generated and modified by the user for compliance and disaster recovery purposes.
2. Application level auditing and control: tracks information downloaded from any type of application and data source into any file.

Embodiments of the present disclosure provide the following remote management component:
   1. Compliance ready templates provides risk maps and positive proof of safe harbors.
   2. Policies, which allow or disallow usage of content.
   3. APIs, that support integrations with other InfoSec and Audit systems. Support for Contingent Workforce systems planned (such as SAP Fieldglass).
   4. Kill-pill and hold-pill capabilities: Kill-pills to wipe data (and hold pills to encrypt and wait in standby) are available for individual files or entire endpoints.

The solution presents a unique, efficient platform that achieves asset security in a shared computing environment without requiring a large software stack, extensive downloads or burdening the endpoint (less than 1% CPU).

FIG. 9 provides an overview of software application functions consistent with the embodiments of the present disclosure. FIG. 9 illustrates a flow 900 of data with the end-point user 904 being the center of the data flow in the context of platform modules and components described therein. For example, software component or module 902 monitors and secures data using headers 906 and classifications 908.

Figure 10:
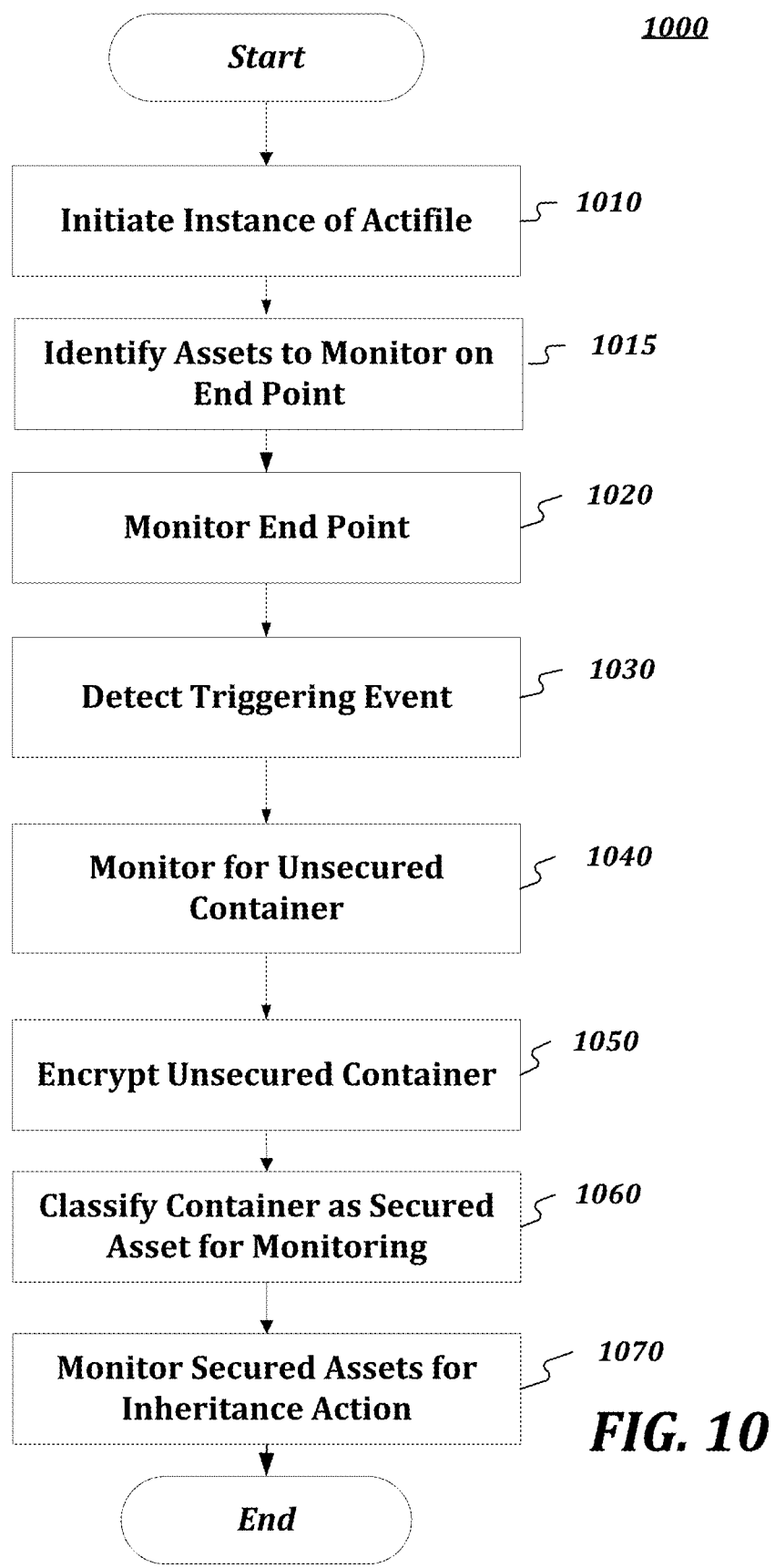

FIG. 10 is a flow chart setting forth the general stages involved in a method 1000 consistent with an embodiment of the disclosure for providing the platform. Method 1000 may be implemented using a computing device 1900 as described in more detail below with respect to FIG. 19.

Although method 1000 has been described to be performed by platform 700, it should be understood that computing device 1900 may be used to perform the various stages of method 1000. Furthermore, in some embodiments, different operations may be performed by different networked elements in operative communication with computing device 1900. For example, a server may be employed in the performance of some or all of the stages in method 1000. Moreover, the server may be configured much like computing device 1900.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1000 will be described in greater detail below.

In general, the method can be said to map, at least in part, and in no particular order, to the following operations:
   i) monitoring an end-point and secured assets residing within a shared computing environment on the end-point;
   ii) detecting a first action on the end-point with regard to a secured asset (e.g., an copy action within, for example, a trusted application such as, for example, a web-browser loading a secured URL);
   iii) monitoring the end-point to detect an unsecured container (e.g., a child record, object or file rendered by, for example, an untrusted application such as, for example, a word-processor generating a new document) to detect as second action (e.g., a paste action within, for example, the untrusted application);
   iv) classifying the unsecured container (e.g., the child word document) to determine if at least a portion of the secured asset has been transferred to the unsecured container (e.g., rules-based classification);
   v) performing a predefined action (e.g., encryption of a child object, alerting an administrator etc.) in accordance to the rules associated with the detected action, classification type of the secured asset, and a role of the owner of the end-point; and
   vi) propagating an inheritance security status to the child object (e.g., metadata defining a security classification of an asset in a shared computing environment).

For a sensitive data source, such as, but not limited to, for example, Salesforce™ or Box™, the platform may be configured to limit a use of a file associated with the sensitive data source to only trusted applications. A trusted application may be one in which is in operative communication and control, at least in part, by the platform. So, by way of one non-limited example, a user may be limited to only use files downloaded data from Salesforce in MS WORD and be limited to only save files from MS WORD to SALESFORCE. Other configurations are possible and anticipated to be within the scope of the present disclosure.

In some embodiments, in an initial stage of the platform deployment to an organization, an organization may first understand what data sources and applications are used by which end-point and users, to determine their respective policy. The platform may be initially deployed to identify any file creation activity (including, for example, operations such as: extract, download, copy & paste) from any data source by any application (trusted or otherwise). So, in essence, the platform may be configured to first monitor all end-point activities. Next, the platform may identify and implement protection rules, that apply only to what the organization considers as sensitive assets to secure. In this way, the platform may be configured to implement the secured asset monitoring using end-point minimal system resources, as well as a plurality of additional benefits.

Generally, the method 1000 includes initiating an instance of a software module, such as modules 711 and/or 902, at block 1010. Thereafter, the method 1000 includes identifying assets to monitor on an end-point, at block 1015. For example, identifying assets may include identifying any available asset on any available resource. The identifying may also include implementation of a header or header data that can be used to easily track assets.

The method 1000 further includes monitoring the end-point, at block 1020. For example, monitoring an end-point may include monitoring activities to determine that an asset is used, copied, modified, or otherwise accessed.

The method 1000 further includes detecting a trigger event, at block 1030. The trigger event can include any suitable event, such as, for example, access of a file, access of a clipboard, or other activities.

The method 1000 further includes monitoring for an unsecured container, at block 1040. For example, when an unsecured container is used to hold classified information or data originating from a classified source, the unsecured container should be secured. Accordingly, the method 1000 also includes encrypting the unsecured container, at block 1050.

The method 1000 also includes classifying the encrypted container as a secured asset for monitoring, and monitoring secured assets for inheritance action, at blocks 1060 and 1070. For example, in certain instances, the platform 700 may analyze metadata associated with the data to ascertain an inheritance status indicative of whether the data has received content that may have been, for example, extracted from a secured asset.

IV. Platform Operation

Although the methods disclosed have been described to be performed by the platform, it should be understood that computing device 1900 may be used to perform the various stages of the methods. Furthermore, in some embodiments, different operations may be performed by different networked elements in operative communication with computing device 1900.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods disclosed herein will be described in greater detail below.

1. A method that may be performed by the platform 700:
   i) distinguish and identify secured assets that are permitted to an end-point to employ within a shared computing environment;
   ii) monitor the end-point for certain triggering events, such as, for example, but not limited to, data creation, reception, manipulation, storage, or extraction associated with a secured asset; and
   iii) upon detection of a triggering event associated with the secured asset, implement rules-based actions, controls or alerts associated with the secured asset.
2. A method that may be performed by the platform 700:
   vi) distinguish and identify secured assets that are permitted to an end-point to employ within a shared computing environment;
   vii) monitor the end-point for certain triggering events, such as, for example, but not limited to, data creation, reception, manipulation, storage, or extraction associated with a secured asset;
   v) upon detection of a triggering event, monitor at least one unsecured container in order to determine if at least a portion of the secured asset has been otherwise transferred to an unsecured container;
   viii) encrypt the unsecured container in order to secure the otherwise unsecured asset within the encrypted container upon a determination that the unsecured container contains at least a portion of a secured asset;
   ix) classify the encrypted container as a secured asset by propagating a security status to a metadata associated with the encrypted container; and
   x) monitor, track, control, audit, and re-classify, as needed, the secured assets without expending system resources on monitoring the private assets.
3. A method that may be performed by the platform 700:
   i) monitoring an end-point and secured assets residing within a shared computing environment on the end-point;
   ii) detecting a first action on the end-point with regard to a secured asset (e.g., an copy action within, for example, a trusted application such as, for example, a web-browser loading a secured URL);
   iii) monitoring the end-point to detect an unsecured container (e.g., a child record, object or file rendered by, for example, an untrusted application such as, for example, a word-processor generating a new document) to detect as second action (e.g., a paste action within, for example, the untrusted application);
   iv) classifying the unsecured container (e.g., the child word document) to determine if at least a portion of the secured asset has been transferred to the unsecured container (e.g., rules-based classification);
   v) performing a predefined action (e.g., encryption of a child object, alerting an administrator etc.) in accordance to the rules associated with the detected action, classification type of the secured asset, and a role of the owner of the end-point; and
   vi) propagating an inheritance security status to the child object (e.g., metadata defining a security classification of an asset in a shared computing environment).
4. Methods that may be performed by the platform 700:
   i) User interaction monitoring;
   ii) Application and process monitoring; and
   iii) File level activity monitoring.
5. Methods that may be performed by the platform 700:
   i) Data type based classification;
   ii) Origin based classification; and
   iii) Inheritance based classification.

Figure 11:
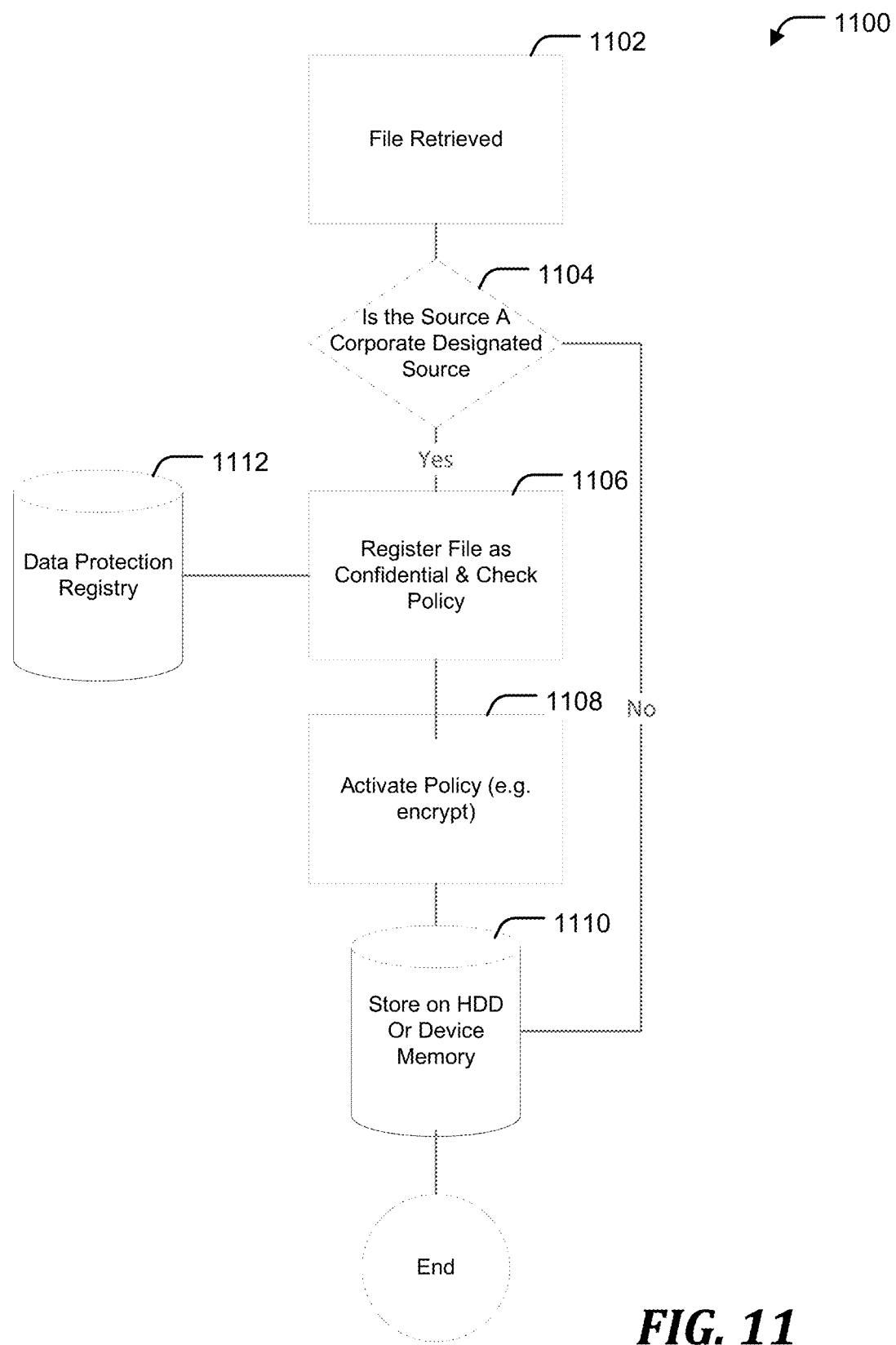
Figure 12:
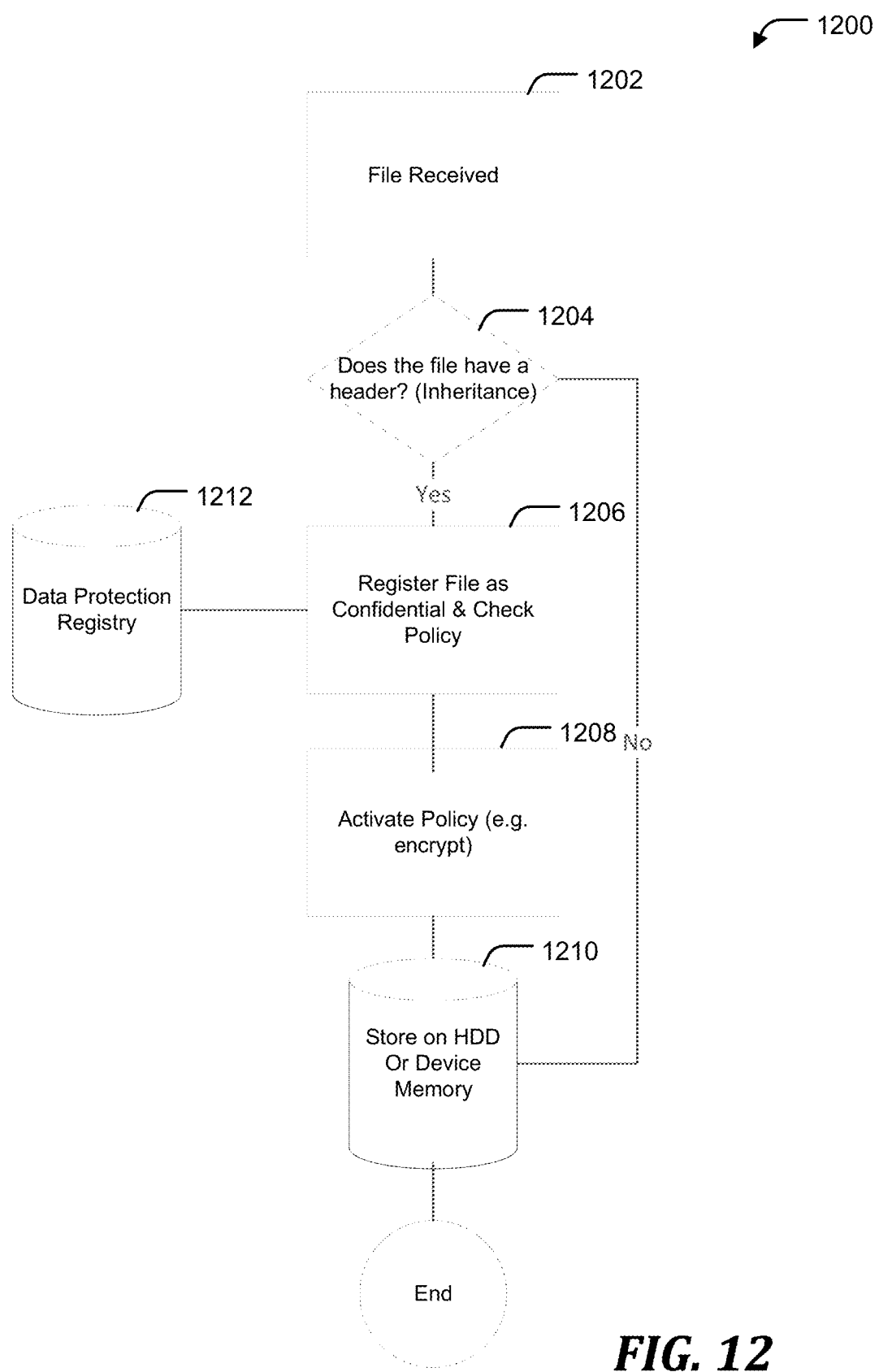

FIG. 11 and FIG. 12 Illustrate a method for Receiving (1100) and Retrieving Files (1200). The two scenarios shown consist of an unmanaged endpoint device such as a laptop. In FIG. 11, the user accesses a source (such as a web page or service, an online storage service, an intranet using a VPN, etc.) and retrieves a file. The system checks against a list of services and addresses (lists managed within the system or lists gleaned from other systems such as CASB and DLP), and if the source is deemed to contain sensitive data, enforces policies on the retrieved data.

Accordingly, the method 1100 includes retrieving a file at 1102 and determining if the source of the retrieved file is a designated source at 1104. The method 1100 also includes registering the file as confidential and checking policy, at block 1106. For example, a data protection registry 1112 may be used to register the file.

The method 1100 also include activating policy at 1108 and storing the file on a disk drive or other storage on the end-point, at block 1110.

In FIG. 12, a file coming in through a generic mechanism (such as email) is demonstrated. The decision of this file is sensitive or not uses a different mechanism—that of inheritance. Files which are sensitive are encrypted and a header that stores the policy is added. Upon reception of the file, the system checks if it inherits a policy, and if so enforces the policy.

Thus, the method 1200 includes receiving a file at block 1202 and determining if the file includes a header at block 1204. Thereafter, the file is registered as confidential and policy is checked at block 1206. Data protection registry 1212 may be used for registration. The method 1200 further includes activating the policy at block 1208 and storing the file on a disk drive or other storage on the end-point, at block 1210.

Figure 13:
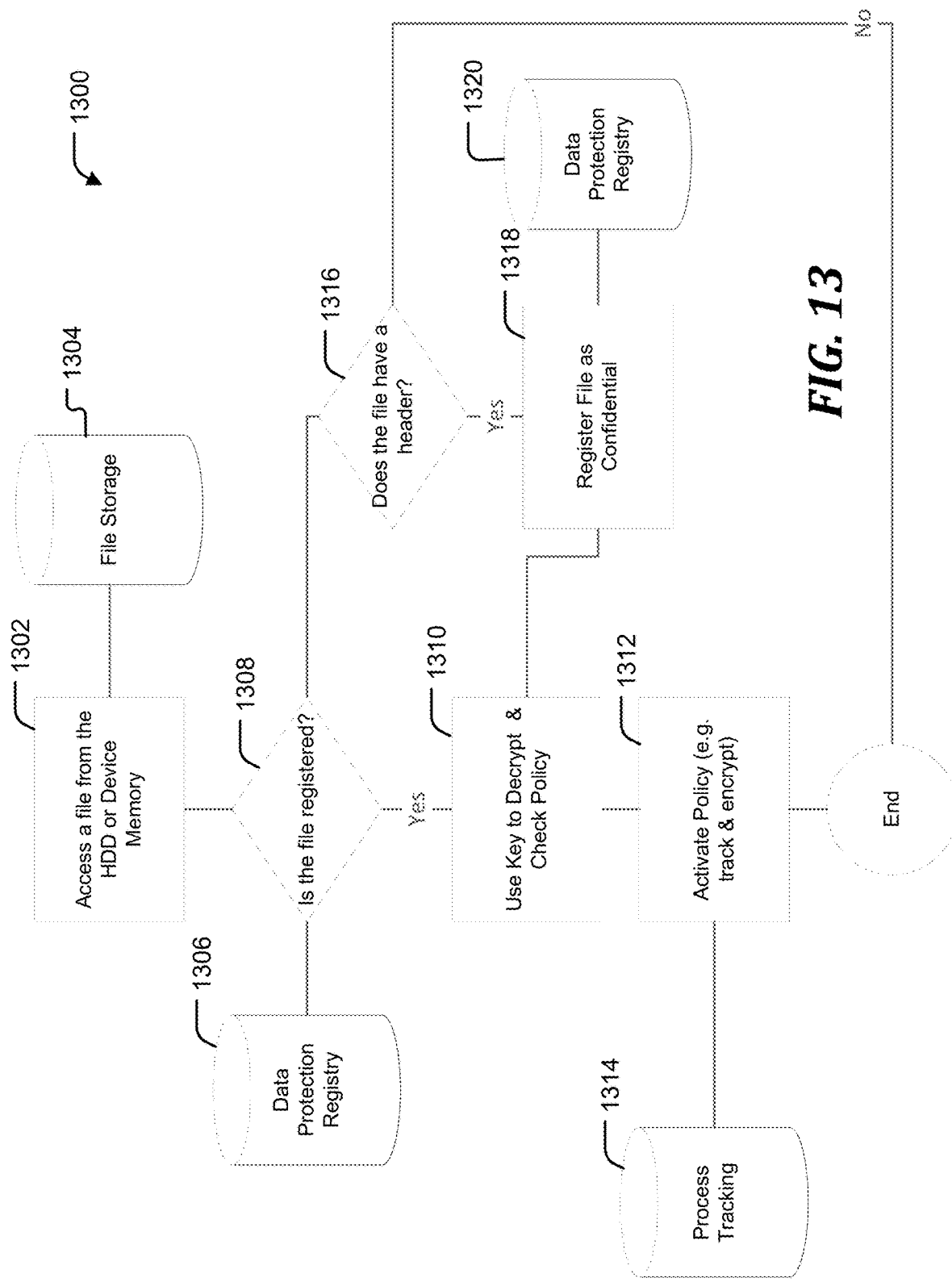

FIG. 13 is a flow chart of a method 1300 for securing an opened file within a shared computing environment. Files in local storage may be registered in the protection database. In some cases they may be downloaded by an unknown application (undesignated) and will depend on inheritance (i.e. header) or DLP type policies to be identified as sensitive and added to the data protection registry. Once in the registry the system can continue to track the content as it traverses applications and threads.

The method 1300 includes accessing a file from file storage 1304, at block 1302. Thereafter, the method 1300 includes determining if the file is registered in data protection registry 1306, at block 1308. If the file has a header (1316), the file is treated at confidential at block 1318 and registered at data protection registry 1320.

The method 1300 also includes decrypting a file to check policy at block 1310 and activating the policy at block 1312. Process tracking 1314 may also be implemented.

Figure 14:
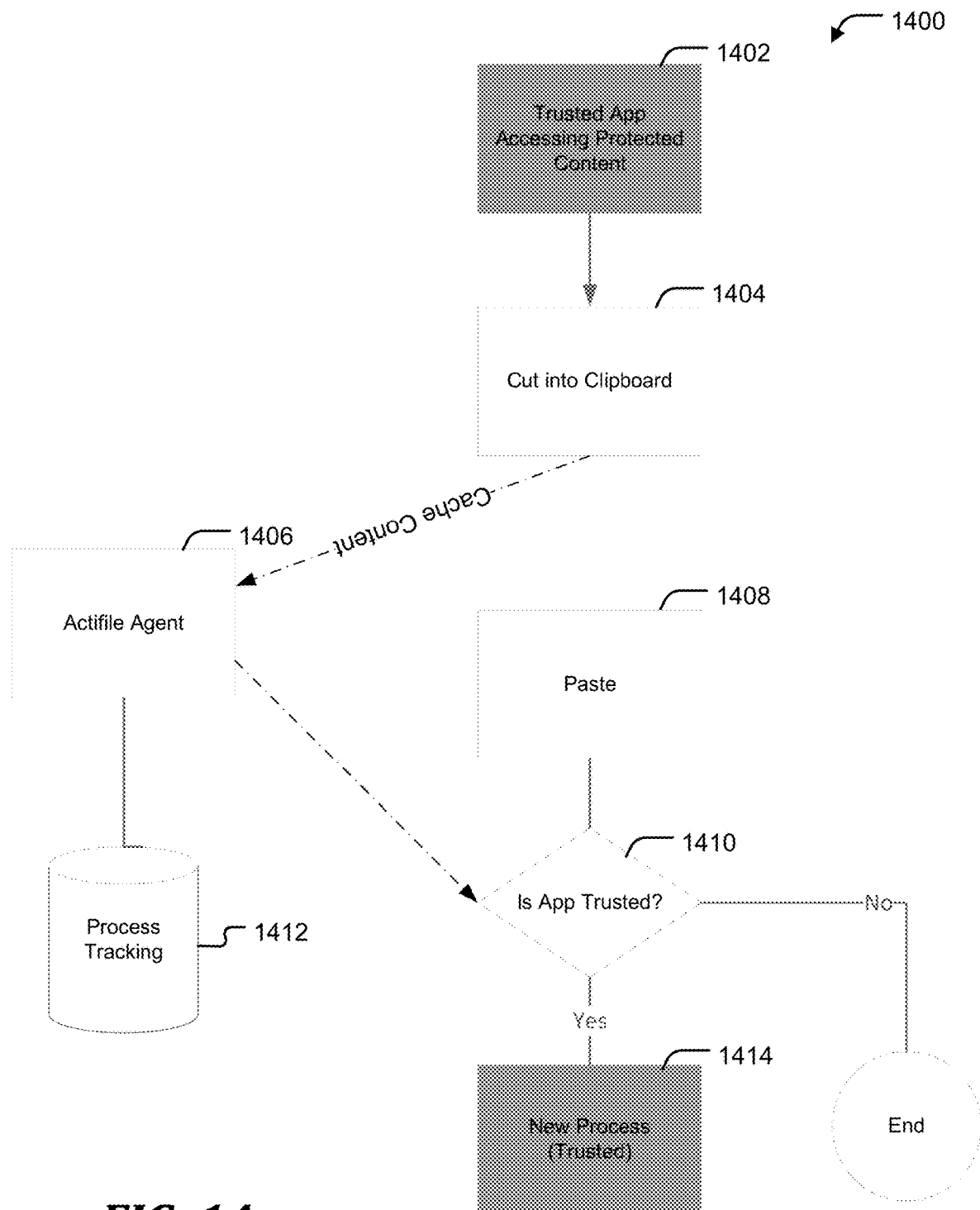

FIG. 14 is a flow chart of a method 1400 for securing an extracted asset within a shared computing environment. Cut & paste between applications and/or between different windows of an application is a popular way to reuse information. For example, taking a log file and importing it into excel. Or cutting and pasting log entries to Microsoft™ Powerpoint™ for a presentation. Identifying that data that is sensitive has been used in such a way works by tracking the files and the processes that make use of the sensitive data through the clipboard.

Data pasted into the clipboard is deleted from the clipboard—until a user pastes the data. If the paste is allowed (i.e., a trusted application), the system repopulates the clipboard with the erased data until the paste is completed.

The method 1400 includes accessing protected content at block 1402. A portion of the file is cut into a clipboard function of an operating system, running on a processor of an end-point, at block 1404. Software module (e.g., 711) 1406 monitors the activity and implements process tracking 1412. Thereafter, in a paste operations 1408, the method 1400 determines if the application is a trusted app, at block 1410, and implements new process 1414 based on the determination.

Figure 15:
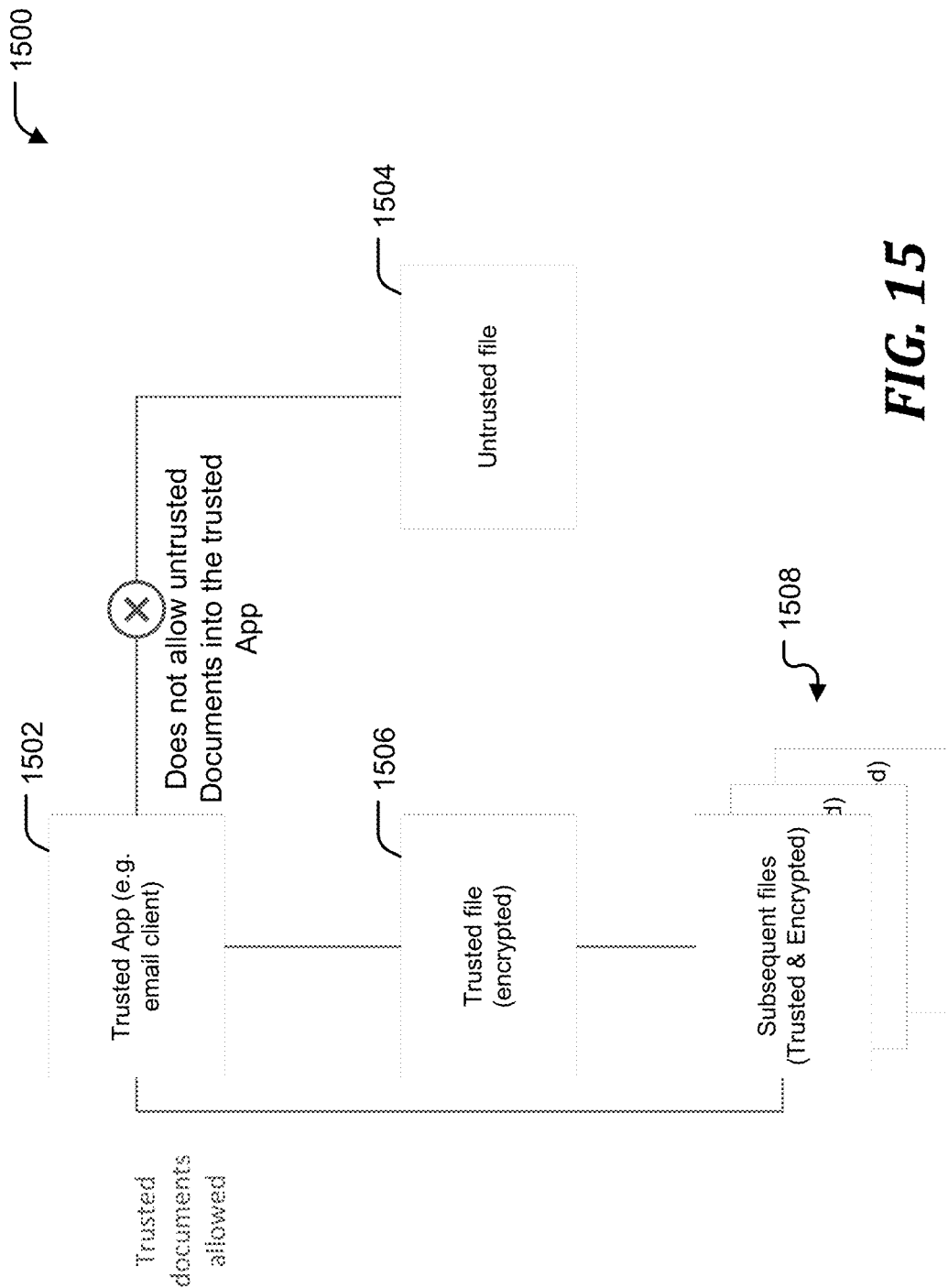

FIG. 15 is a flow chart of a method 1500 for employing a trusted application within a shared computing environment. Preventing ingress of untrusted data is also important to many organizations. The reasons for preventing ingress of data range from preventing tainting of IP, ingress of private information that isn't the organizations', and virus prevention. One facet of the invention is ensuring that trusted applications can be set up so only trusted information can be uploaded to these applications.

As shown, the method 1500 includes allowing documents from trusted application 1502, trusted file 1506, and encrypted files 1508. Untrusted file 1504 is blocked from beings used in the trusted application.

FIG. 16 is a flow chart of a method 1600 for deploying an application associated with certain embodiments of the present disclosure. One concern many mixed use device users have with information security is about leakage of information from one customer to another. Hence, having the ability to turn off the application when the user isn't making use of the sensitive information is important.

The flow chart 1600 shows how, as the user "logs out" (logs out virtually)—the system checks that processes are off and that all sensitive data is encrypted and inaccessible and that the clipboard is free of sensitive data in steps 1602, 1604, 1608, and 1610. The method 1600 also includes process tracking 1606. The software module 711 may be disabled after or at the close of the logging out procedure at block 1612.

The platform may further enable users to perform a plurality of other administrator functions. For example, users may be grouped, and otherwise organized. Groups of users may be given certain rights and privileges, such as, for example, rights to download files from other users and other groups of users.

FIG. 17 is a flow chart of a method 1700 for encrypting and decrypting data associated with certain embodiments of the present disclosure. Method 1700 may begin at starting block 1705 and proceed to stage 1710 where the platform may receive a selection of administrator rules. Administrator rules may be associated with, for example, users, user settings, groups of users, and devices to be associated with file backups, as well as backup settings. Backup settings may include types of files to back up. The platform may provide users with a dashboard for selecting specific file types for backup, such as, for example, but not limited to, Microsoft Office files (e.g., .doc, .docx, .xls, and .xlsx files, etc.), Open Office files (e.g., .ots, .otd, and .otp files, etc.), PDFs, image files, and HTML files.

The platform may enable the administrator to group users together. For example, marketing employees may be placed in one group and engineers may be placed in another group. Permissions, such as, for example, permissions to preview, upload and download files may be associated with users or groups of users.

The platform may enable users to select further administrator rules, including, for example, two-step verification.

In some embodiments, as part of the received administrator rules, the platform may receive triggers for causing the platform to back up a file. The triggers may include, for example, but not be limited to, a file being downloaded, created, saved, modified, accessed, copied, renamed on the computing device or deleted from the computing device. In some embodiments, the triggers may be preset.

From stage 1710, where the platform receives a selection of administrator rules, method 1700 may proceed to stage 1720, where platform receives a trigger. For example, the platform may receive notice that a file has been modified. Notice may be provided by a listener module configured to detect and track computing events.

From stage 1720, where the platform receives trigger, method 1700 may proceed to stage 1730 where the platform may encrypt files upon receipt of one of the triggers. For example, a file encryption software may exist on the user's computer. The encryption software may, for example, generate an encrypted copy of the file and save it on the user's computer. It should be noted that encryption is an optional stage. It should be further understood that, if the encryption stage is present, it may be performed at various points within the platform (e.g., client-side, server-side). Encryption may be performed to prevent data leakage, data loss and enable an improved content monitoring.

From stage 1730, where the platform encrypts the file, method 1700 may advance to stage 1740 where the platform may embed metadata associated with the file and upload the file with embedded metadata to the server. Metadata may include, for example, but not be limited to, date and time of creation, last modification, and last accessing, user who created, last modified, and last accessed the file, storage location on the user's computing device, file size, and security details.

Once the platform embeds metadata with the file and uploads the file with the metadata to the server in stage 1740, method 1700 may continue to stage 1750 where the platform may index and analyze files. The platform may extract textual content from the files, then indexes and analyzing for potential content violations. For example, platform may run rules created by the administrator. Rules can include, but not be limited to, for example: find credit card pattern in document/file content, find Social security ID, find documents with lists of contacts, name of medicine. In all cases content alerts may be sent to administrators. In some embodiments, the platform may enable users to perform custom queries. In further embodiments, the platform may enable users to create alerts, such as, for example, when a specific user modifies a file type. The platform may further enable users to back up some or all files on a server or device of choice, create content alerts, track the path of the file in organization, to view versions.

In some embodiments, the platform may enable users to preview files. In such embodiments, previewing may be limited to users with specific access to files for previewing. After platform indexes and analyzes files in stage 1750, method 1700 may proceed to stage 1760 where the platform may download the file to the user's computer. In some embodiments, access to files for downloading may be restricted for certain users.

After the platform downloads the file in stage in stage 1760, method 1700 may proceed to stage 1770 where the platform may decrypt the downloaded file. In some embodiments, the decryption software may exist on the user's device. In further embodiments, decryption access may be restricted for certain users.

Once the platform decrypts the downloaded file in stage 1770, method 1700 may then end at stage 1780.

FIG. 18 illustrates platform 1800, which is arranged somewhat similarly to platform 700. As shown, policy synchronization 1810, audit export 1808, API access 1802, provisioning subsystem 1814 contingent workforce management 1816, external API 1818, software module 1822 and other apps 1824 are implemented. A protected device 1804 is used to access secured assets/data while maintaining policy with modules 1812, 1806, and 1820.

FIG. 20 illustrates a Venn diagram of an embodiment for securing assets. For example, in some embodiments, it may be preferable to secure an asset only after the business processes that make use of the data are completed. In this case, when the platform identifies a secure asset, it may be preferable to wait until a configurable time has passed, or until other triggers take place, before continuing to secure (e.g., encrypt) the asset. As per the Venn diagram below, this may help reduce the risk associated with data assets, but without interfering with the business processes that make use of the data.

V. Hardware Implementation

The platform may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform may be hosted on a centralized server, such as, for example, a cloud computing service. Although methods have been described to be performed by a computing device 1900, it should be understood that, in some embodiments, different operations may be performed by different networked elements in operative communication with computing device 1900.

Embodiments of the present disclosure may comprise a system having a memory storage and a processing unit. The processing unit coupled to the memory storage, wherein the processing unit is configured to perform the stages of methods disclosed herein.

FIG. 19 is a block diagram of a system including computing device 1900. Consistent with an embodiment of the disclosure, the aforementioned memory storage and processing unit may be implemented in a computing device, such as computing device 1900 of FIG. 19. Any suitable combination of hardware, software, or firmware may be used to implement the memory storage and processing unit. For example, the memory storage and processing unit may be implemented with computing device 1900 or any of other computing devices 1918, in combination with computing device 1900. The aforementioned system, device, and processors are examples and other systems, devices, and processors may comprise the aforementioned memory storage and processing unit, consistent with embodiments of the disclosure.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g., random access memory (RAM)), non-volatile (e.g., read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image encoding module, machine learning module and image classifying module. Furthermore, programming modules 1906 may comprise a user interface module, a content capturing module, a timing module, a location module, an and a communications module, a content generation module, a content transmission module, a content organization module, and a content display module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and nonvolatile, removable and non-removable media implemented in any method or technology for storage of information, such as computer readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 (e.g., application 1920) may perform processes including, for example, stages of one or more of methods as disclosed herein. The aforementioned process is an example, and processing unit 1902 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

VI. Aspects

Generally, as disclosed herein, a plurality of aspects are associated with this disclosure. Aspect 1 may include a platform configured to employ methods and systems to provide at least the following functions: distinguish and identify secured assets that are permitted to an end-point to employ within a shared computing environment; monitor the end-point for certain triggering events associated with a secured asset; and upon detection of a triggering event associated with the secured asset, implement rules-based actions, controls, or alerts associated with the secured asset.

Aspect 2 includes the platform of any preceding aspect, further comprising: upon detection of a triggering event, monitor at least one unsecured container in order to determine if at least a portion of the secured asset has been otherwise transferred to an unsecured container; encrypt the unsecured container in order to secure the otherwise unsecured asset within the encrypted container upon a determination that the unsecured container contains at least a portion of a secured asset; classify the encrypted container as a secured asset by propagating a security status to a metadata associated with the encrypted container; and monitor, track, control, audit, and re-classify, the secured assets without expending system resources on monitoring the private assets.

Aspect 3 includes the platform of any preceding aspect, further comprising a plurality of secured assets in communication with the end-point.

Aspect 4 includes the platform of any preceding aspect, further comprising a software component deployed on the end-point.

Aspect 5 includes the platform of any preceding aspect, wherein the software component is a multi-layer software component configured to enhance data security.

Aspect 6 includes the platform of any preceding aspect, wherein the multi-layer software component includes a device monitoring layer configured to monitor data use on the end-point.

Aspect 7 includes the platform of any preceding aspect, wherein the multi-layer software component includes an application monitoring later configured to monitor application use on the end-point.

Aspect 8 includes the platform of any preceding aspect, wherein the multi-layer software component includes a network monitoring layer configured to monitor network usage on the end-point.

Aspect 9 includes the platform of any preceding aspect, wherein the multi-layer software component includes an encryption layer configured to encrypt secured assets.

Aspect 10 includes the platform of any preceding aspect, wherein secured assets are accessed in the end-point in accordance with rules implemented through a software module propagated in the shared computing environment.

Aspect 11 includes a platform configured to employ methods and systems to provide at least the following functions: monitoring an end-point and secured assets residing within a shared computing environment on the end-point; detecting a first action on the end-point about a secured asset; monitoring the end-point to detect an unsecured container to detect as second action; classifying the unsecured container to create a child object to determine if at least a portion of the secured asset has been transferred to the unsecured container; performing a predefined action in accordance to the rules associated with the detected action, classification type of the secured asset, and a role of the owner of the end-point; and propagating an inheritance security status to the child object.

Aspect 12 includes the platform of any preceding aspect, further comprising: monitor, track, control, audit, and re-classify, the secured assets without expending system resources on monitoring the private assets.

Aspect 13 includes the platform of any preceding aspect, further comprising a plurality of secured assets in communication with the end-point.

Aspect 14 includes the platform of any preceding aspect, further comprising a software component deployed on the end-point.

Aspect 15 includes the platform of any preceding aspect, wherein the software component is a multi-layer software component configured to enhance data security.

Aspect 16 includes the platform of any preceding aspect, wherein the multi-layer software component includes a device monitoring layer configured to monitor data use on the end-point.

Aspect 17 includes the platform of any preceding aspect, wherein the multi-layer software component includes an application monitoring later configured to monitor application use on the end-point.

Aspect 18 includes the platform of any preceding aspect, wherein the multi-layer software component includes a network monitoring layer configured to monitor network usage on the end-point.

Aspect 19 includes the platform of any preceding aspect, wherein the multi-layer software component includes an encryption layer configured to encrypt secured assets.

Aspect 20 includes the platform of any preceding aspect, wherein secured assets are accessed in the end-point in accordance with rules implemented through a software module propagated in the shared computing environment.

Aspect 21 includes a method of securing assets in a shared computing environment, the method comprising: distinguishing secured assets that are permitted to an end-point to employ within the shared computing environment; monitoring the end-point for certain triggering events associated with a secured asset; and implementing rules-based actions, controls, or alerts associated with the secured asset in response to a triggering event.

Aspect 22 includes the method of any preceding aspect, further comprising: upon detection of a triggering event, monitoring at least one unsecured container in order to determine if at least a portion of the secured asset has been otherwise transferred to an unsecured container; encrypting the unsecured container in order to secure the otherwise unsecured asset within the encrypted container upon a determination that the unsecured container contains at least a portion of a secured asset; classifying the encrypted container as a secured asset by propagating a security status to a metadata associated with the encrypted container; and monitoring, tracking, controlling, auditing, and re-classifying, the secured assets without expending system resources on monitoring private assets.

Aspect 23 includes the method of any preceding aspect, further comprising monitoring the end-point and secured assets residing within the shared computing environment; detecting a first action on the end-point with regard to a secured asset; monitoring the end-point to detect an unsecured container to detect as a second action; classifying the unsecured container to create a child object to determine if at least a portion of the secured asset has been transferred to the unsecured container; performing a predefined action in accordance to the rules associated with the detected action, classification type of the secured asset, and a role of the owner of the end-point; and propagating an inheritance security status to the child object.

Aspect 24 includes the feature of classifying a data asset as a secured asset based on analysis of data type and origin of the data asset.

Aspect 25 includes the feature of automatically propagating a security status (e.g., secured asset) of a data asset to a child data asset derived from the data asset (e.g., copying a portion of the data asset, performing "save as" operation etc.) by including the security status in the header portion of the child data asset.

Aspect 26 includes the feature of propagating a security status of a data asset to a child data asset derived from the data asset based on a re-classification (i.e. data validation) of the data comprised in the child data asset.

The following Aspects may be monitored by an client running on a client device consistent with embodiments of the present disclosure:
  User Interactions
    Monitors User Inputs into the Computing Device as a whole
    E.g., when Data is extracted from a Word Document (ctrl+x/c)
    Answers: when to Trigger Actifile Functions
  Apps and Processes
    Detect Extraction Events on Relevant Secured Assets on various Platforms configured to access Secured Assets
    Relevant to only Data Sources that are Secured Assets
  File Level Security
    Access/Edit restrictions
    Encryption with Key prior to delivery onto external storage medium of extraction
    In this way, the platform may ensure that all activity with regard to our secured assets remains secured and under-encryption, as it is accessed and manipulated Some of the technical advantages of the various aspects and embodiments herein may include, but not be limited to:
  There is currently a need to provide authenticated users which are given the right level of permissions (authorization) by the organization the ability to work seamlessly w/o any change of user's work environment (like the use of virtual machines), but with one main difference: all the information related to the organization is governed: if extracted, downloaded or already existing, secured with encryption, monitored and archived. Conceptually it creates a "secured area" which is a virtual extension of the organization, in places like BYOD or shared endpoints that serve both private and corporation.
  The platform of the present disclosure goes beyond simple data identification according to predefined strings (though it includes that capability as well), to origin classification and (Where did the information come from) and inheritance classification (identify all grandchildren, grand-grandchildren, etc). This combination of capabilities may assure the classification is not event based (files is sent out of the organization as an example), but persistent at all times, can be turned on once the user logged in, and does not interfere with other private information assesses.
  The platform of the present disclosure may enable identification of any data source: Cloud, On Prem or locally based, of any type: Application (ERP, CRM), Database, File Share and others. The platform of the present disclosure may be agnostic not only the data source, but it immediately invokes an action of the file created on any source, regardless of the user action (copy & paste or download for instance), the tool used (office, BI tool, SQL Client, etc.) and regardless of the file type created. An action may be triggered according to a pre-defined rule, for instance encrypt. Of particular importance, this technology may allow organizations to treat endpoints as transparent—encrypting data flowing out and decrypting it as it flows back in. This may significantly simplify endpoint rules.

VII. ACTIFILE™

Disclosure in this section is to provide one non-limiting, illustrative example of some embodiments of the present disclosure, with particular reference to the ACTIFILE™ solution.

Actifile's technology has the following capabilities at the endpoint:
  1. File level auditing and controls:
    a. a lightweight discovery engine for detecting data at rest risks.
    b. transparent encryption with group share functions and support for local and remote folders.
    c. file usage auditing and control through processes and windows (print, copy, delete etc.).
    d. archives employer's information generated and modified by the user for compliance and disaster recovery purposes.
  2. Application level auditing and control: tracks information downloaded from any type of application and data source into any file.

Actifile's technology has a remote management component:
  1. Compliance ready templates provides risk maps and positive proof of safe harbors.
  2. Policies, which allow or disallow usage of content.
  3. APIs, that support integrations with other InfoSec and Audit systems. Support for Contingent Workforce systems planned (such as SAP Fieldglass).
  4. Kill-pill and hold-pill capabilities: Kill-pills to wipe data (and hold pills to encrypt and wait in standby) are available for individual files or entire endpoints.

Actifile's unique, efficient technology achieves this without requiring a large software stack, extensive downloads or burdening the endpoint (less than 1% CPU). In today's economy, people value their privacy and their use of BYOD or corporate device for personal purposes. The Actifile "Chinese Wall" solution enables the secure monitoring, tracking, and encryption of secured data assets while preserving, to the greatest extent, privacy, data security and personal productivity. Moreover, since many users will share the same work environment with private data and other data there is a need for a technology that can transparently isolate sensitive data from other data.

Actifile achieves this by monitoring data that resides on a client device, is created on a client device, or is received by a client device. The extent of this process on the client device is governed by the user's role, as outlined in the table presented in the figure below. Once active, the ActiFile Chinese Wall technology will determine the Data Type and the Origin of the Data type in order to determine whether the data is to be a 'secured' asset.

Actifile's technology may provide at least the following functions and features:

Data Identification:
  Read the Data to determine what Type of Data it is,
  Classify Data based on Type,
  Each Type will have Classification Rules for Classifying the Data as "Secure" or "Unsecured" Asset.

Origin Identification:
  Where did this Data come from? Is it a personal data or corporate data?
  Did it come from a corporate email address?
  Is the creator of the file a corporation?
  For example, a Social Security might be a "Secured" classified data type, but only if the origin is also a classified Type.
  So, it is important to look at the Origin as well as the Data Type.

Inheritance Classification:
  Once it is determined that this file is to be classified as "Secured", the Actifile Auditing/Monitoring/Tracking/Encrypting technology is working. Part of its job is to add an 'Inherited" header. The platform may add a header to the file and any other file that might contain data from the Secured Asset. This header then serves to automatically ensure that the file or subsequent files gets marked as "secured" classification, even if their origin data is erased, a child file is created, or tracking the origin no longer becomes feasible.
  Similarly, if a "Secured" document is loaded, the platform may be monitoring its usage (key strokes/copy paste) to ensure any new documents that include the data will be "inherited" and tagged accordingly.
  In some embodiments, a new "data validation" stage may be done, in order to determine whether the new document still contains the necessary data to protect. In other words, in some embodiments, the platform may still check on "data ID" of the child document before applying the 'inherited" tag. In other embodiments, the platform may just automatically apply the "inherited" tag without revalidating Data.
  All in all, this tag/header will serve to ensure that the children files, even though they may lose their origin data (e.g., get emailed from a private server or 'save as' operation to create a new file).

High Level Overview of Certain Aspects and Embodiments of the ACTIFILE™ Solution 1) Method for Information Governance for the Gig Economy/or for the Supply Chain/Organization Edge: Extending InfoSec management to Endpoints wherever they are (internal or external, dedicated or shared), w/o violating privacy or $3^{rd}$ (shared) party data.

Actifile's core concept extends Information Governance from fully owned, fully managed endpoints of the internal organization, to the outer realm of the organization. Organizations provide access to systems, or share files with $3^{rd}$ parties, subcontractors, contingent workforce, on a regular basis. While there are existing methods of securing a single file (such as rights management or RMS), these systems are limited in scope and hard to integrate into existing workflows. There is currently a need to provide authenticated users which are given the right level of permissions (authorization) by the organization the ability to work seamlessly w/o any change of user's work environment (like the use of virtual machines), but with one main difference: all the information related to the organization is governed: if extracted, downloaded or already existing, secured with encryption, monitored and archived. Conceptually it creates a "secured area" which is a virtual extension of the organization, in places like BYOD or shared endpoints that serve both private and corporation.

2) Technology for "Chinese Wall": Since many users will share the same work environment with private data and other data there is a need for a technology that can transparently isolate sensitive data from other data. Actifile's method of information security for the gig economy is—Data centric virtual isolation of corporate and private or other corporates information: Actifile unique technology goes beyond simple data identification according to pre-defined strings (though it includes that capability as well), to origin classification and (Where did the information come from) and inheritance classification (identify all grandchildren, grand-grandchildren, etc). This combination of capabilities assures the classification is not event based (files is sent out of the organization as an example), but persistent at all times, can be turned on once the user logged in, and does not interfere with other private information assesses.

3) Origin and target based classification Anytime information is extracted from data source, on the fly action:

Origin and target based classification allows for very effective and easy to set up rules. Actifile technology enables identification of any data source: Cloud, On Prem or locally based, of any type: Application (ERP, CRM), Database, File Share and others. Actifile is agnostic not only the data source, but it immediately invokes an action of the file created on any source, regardless of the user action (copy & paste or download for instance), the tool used (office, BI tool, SQL Client, etc.) and regardless of the file type created. An action is triggered according to a pre-defined rule, for instance encrypt. Of particular importance, this technology allows organizations to treat endpoints as transparent—encrypting data flowing out and decrypting it as it flows back in. This significantly simplifies endpoint rules.

As the diagram below show, Actifile origin and target based information protection, not only simplifies the setup and maintenance of the "Virtual Chinese Wall", but also makes it the right method to safeguard information outside the perimeter, especially on BYOD.

VIII. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
    distinguishing and identifying secured assets that are permitted to an end-point to employ within a shared computing environment;
    monitoring the end-point for certain triggering events associated with a secured asset;
    upon detection of a triggering event associated with the secured asset:
        implementing at least one of the following: rules-based actions, controls, and alerts associated with the secured asset;
    monitoring at least one unsecured container in order to determine if at least a portion of the secured asset has been otherwise transferred to an unsecured container;
    encrypt the unsecured container in order to secure the otherwise unsecured asset within the unsecured container upon a determination that the unsecured container contains at least a portion of the secured asset;
    classify the encrypted container as an additional secured asset by propagating a security status to a metadata associated with the encrypted container; and
    continue to monitor the end-point for the certain triggering events associated with the secured asset and the additional secured asset.

2. The method of claim 1, further comprising communicating with a plurality of secured assets at the end-point.

3. The method of claim 1, further comprising deploying a software component on the end-point.

4. The method of claim 3, wherein the software component is a multi-layer software component configured to enhance data security.

5. The method of claim 4, further comprising providing a device monitoring layer configured to monitor data use on the end-point.

6. The method of claim 4, further comprising providing an application monitoring layer configured to monitor application use on the end-point.

7. The method of claim 4, further comprising providing a network monitoring layer configured to monitor network usage on the end-point.

8. The method of claim 4, further comprising an encryption layer configured to encrypt the secured assets.

9. The method of claim 1, further comprises accessing the secured assets in the end-point in accordance with rules implemented through a software module propagated in the shared computing environment.

10. A method comprising:
    monitoring an end-point and secured assets residing within a shared computing environment on the end-point;
    detecting a first action on the end-point with regard to a secured asset;
    monitoring the end-point to detect an unsecured container to detect as second action;
    classifying the unsecured container to create a child object to determine if at least a portion of the secured asset has been transferred to the unsecured container;
    encrypt the unsecured container in order to secure the otherwise unsecured asset within the encrypted container upon a determination that the unsecured container contains at least a portion of the secured asset;
    performing a predefined action in accordance to rules associated with the detected action, classification type of the secured asset, and a role of an owner of the end-point; and
    propagating an inheritance security status to the child object.

11. The method of claim 10, further comprising communicating with a plurality of secured assets at the end-point.

12. The method of claim 10, further comprising deploying a software component on the end-point.

13. The method of claim 12, wherein the software component is a multi-layer software component configured to enhance data security.

14. The method of claim 13, further comprising providing a device monitoring layer configured to monitor data use on the end-point.

15. The method of claim 13, further comprising providing an application monitoring layer configured to monitor application use on the end-point.

16. The method of claim 13, further comprising providing a network monitoring layer configured to monitor network usage on the end-point.

17. The method of claim 13, further comprising an encryption layer configured to encrypt the secured assets.

18. The method of claim 10, further comprises accessing the secured assets in the end-point in accordance with rules implemented through a software module propagated in the shared computing environment.

19. A method of securing assets in a shared computing environment, the method comprising:
    distinguishing secured assets that are permitted to an end-point to employ within the shared computing environment;
    monitoring the end-point for certain triggering events associated with a secured asset;
    implementing at least one of the following: rules-based actions, controls, and alerts associated with a secured asset in response to a triggering event;
    monitoring the end-point and secured assets residing within the shared computing environment;
    detecting a first action on the end-point with regard to the secured asset;
    monitoring the end-point to detect an unsecured container to detect as a second action;
    classifying the unsecured container to create a child object to determine if at least a portion of the secured asset has been transferred to the unsecured container;
    performing a predefined action in accordance to the rules associated with the detected action, classification type of the secured asset, and a role of a owner of the end-point; and
    propagating an inheritance security status to the child object.

* * * * *